(12) United States Patent
Heilman et al.

(10) Patent No.: US 10,468,923 B2
(45) Date of Patent: Nov. 5, 2019

(54) MOTOR HAVING SPLIT SPRAY RING FOR COOLING END TURNS

(71) Applicant: Nidec Motor Corporation, St. Louis, MO (US)

(72) Inventors: Raymond D. Heilman, Florissant, MO (US); Andrew F. Poag, St. Louis, MO (US); S. Duke Snider, St. Louis, MO (US); John T. Scoble, III, Mena, AR (US); Thomas E. Kirkley, Jr., Caseyville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 375 days.

(21) Appl. No.: 15/256,240

(22) Filed: Sep. 2, 2016

(65) Prior Publication Data

US 2017/0063182 A1 Mar. 2, 2017

Related U.S. Application Data

(60) Provisional application No. 62/213,461, filed on Sep. 2, 2015.

(51) Int. Cl.
*H02K 1/20* (2006.01)
*H02K 5/20* (2006.01)
*H02K 5/173* (2006.01)

(52) U.S. Cl.
CPC ............. *H02K 1/20* (2013.01); *H02K 5/1732* (2013.01); *H02K 5/20* (2013.01); *H02K 2213/09* (2013.01)

(58) Field of Classification Search
CPC .. H02K 1/20; H02K 5/20; H02K 7/08; H02K 9/00; H02K 9/16; H02K 9/19; H02K 3/04; H02K 3/24; H02K 9/197
See application file for complete search history.

(56) References Cited

U.S. PATENT DOCUMENTS

| | | | |
|---|---|---|---|
| 4,973,871 A | 11/1990 | Bisantz | |
| 5,177,385 A * | 1/1993 | Cooper | H02K 1/185 310/260 |
| 8,963,384 B2 | 2/2015 | Kirkley, Jr. et al. | |
| 2005/0151429 A1* | 7/2005 | Taketsuna | H02K 3/24 310/54 |
| 2005/0151431 A1 | 7/2005 | Cronin et al. | |
| 2005/0206248 A1 | 9/2005 | Raszkowski et al. | |
| 2010/0045125 A1* | 2/2010 | Takenaka | H02K 1/20 310/54 |
| 2011/0084561 A1* | 4/2011 | Swales | H02K 9/19 310/54 |
| 2015/0171699 A1 | 6/2015 | Kirkley, Jr. et al. | |

FOREIGN PATENT DOCUMENTS

EP 1215418 A1 * 6/2002 ............... B60K 6/26

* cited by examiner

*Primary Examiner* — Mang Tin Bik Lian
*Assistant Examiner* — Leda T Pham
(74) *Attorney, Agent, or Firm* — Hovey Williams LLP

(57) ABSTRACT

A motor is cooled with a coolant. The motor includes a rotor rotatable about an axis, a stator including a stator core and windings wound about the stator core, a housing enclosing at least a portion of the stator, and a resiliently deflectable spray ring extending circumferentially relative to the axis. The spray ring defines at least one orifice configured to direct coolant on the stator. The spray ring presents first and second arcuately spaced apart ends defining a gap therebetween.

17 Claims, 29 Drawing Sheets

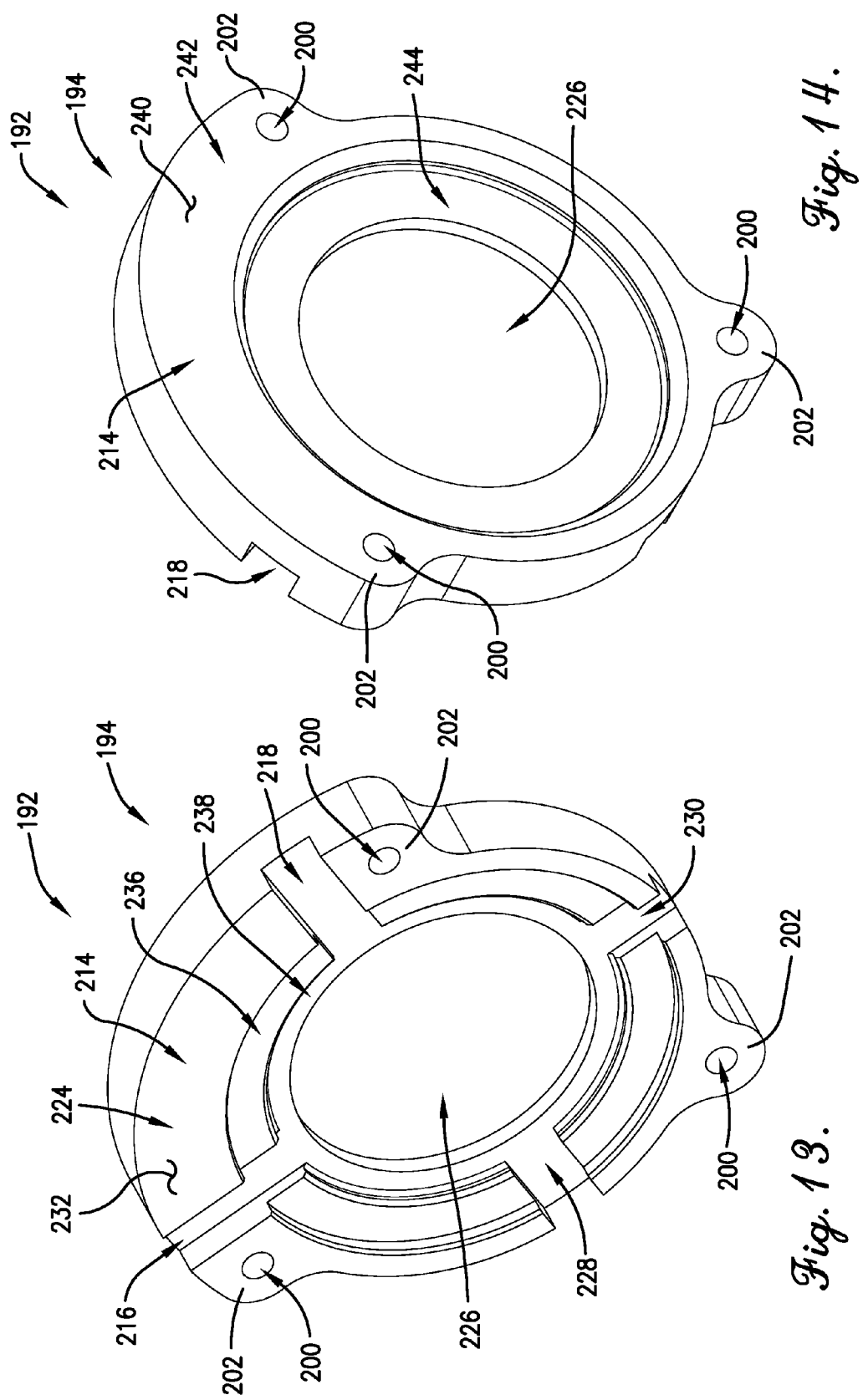

MOTOR HAVING SPLIT SPRAY RING FOR COOLING END TURNS

CROSS-REFERENCE TO RELATED APPLICATIONS

The present application claims priority from U.S. Provisional Application No. 62/213,461 filed Sep. 2, 2015, entitled MOTOR BEARING LUBRICATION ARRANGEMENT, which is hereby incorporated in its entirety by reference herein. The present application is also being filed contemporaneously with a U.S. Non-Provisional Patent Application entitled MOTOR BEARING LUBRICATION ARRANGEMENT, the entire disclosure of which is hereby incorporated by reference herein.

BACKGROUND OF THE INVENTION

1. Field of the Invention

The present invention relates generally to a spray ring for providing coolant to the end turns of a stator.

2. Discussion of the Prior Art

Those of ordinary skill in the art will appreciate that electric motors conventionally include a stator including a core and windings wound about the core. Motor operation typically generates heat that is conventionally at least in part dissipated by means of any one or more of a variety of cooling devices and/or techniques, including but not limited to cooling jackets, heat sinks, fans, and/or sprays. For instance, a coolant might be sprayed onto the windings in order to dissipate heat therefrom.

SUMMARY

According to one aspect of the present invention, a motor configured to be cooled with a coolant is provided. The motor comprises a rotor rotatable about an axis, a stator including a stator core and windings wound about the stator core, a housing enclosing at least a portion of the stator, and a resiliently deflectable spray ring extending circumferentially relative to the axis. The spray ring defines at least one orifice configured to direct coolant on the stator. The spray ring presents first and second arcuately spaced apart ends defining a gap therebetween.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 13 is an enlarged, rear perspective view of the bearing cap of the motor;

FIG. 14 is a front perspective view of the bearing cap as shown in FIG. 13;

Figure 26:
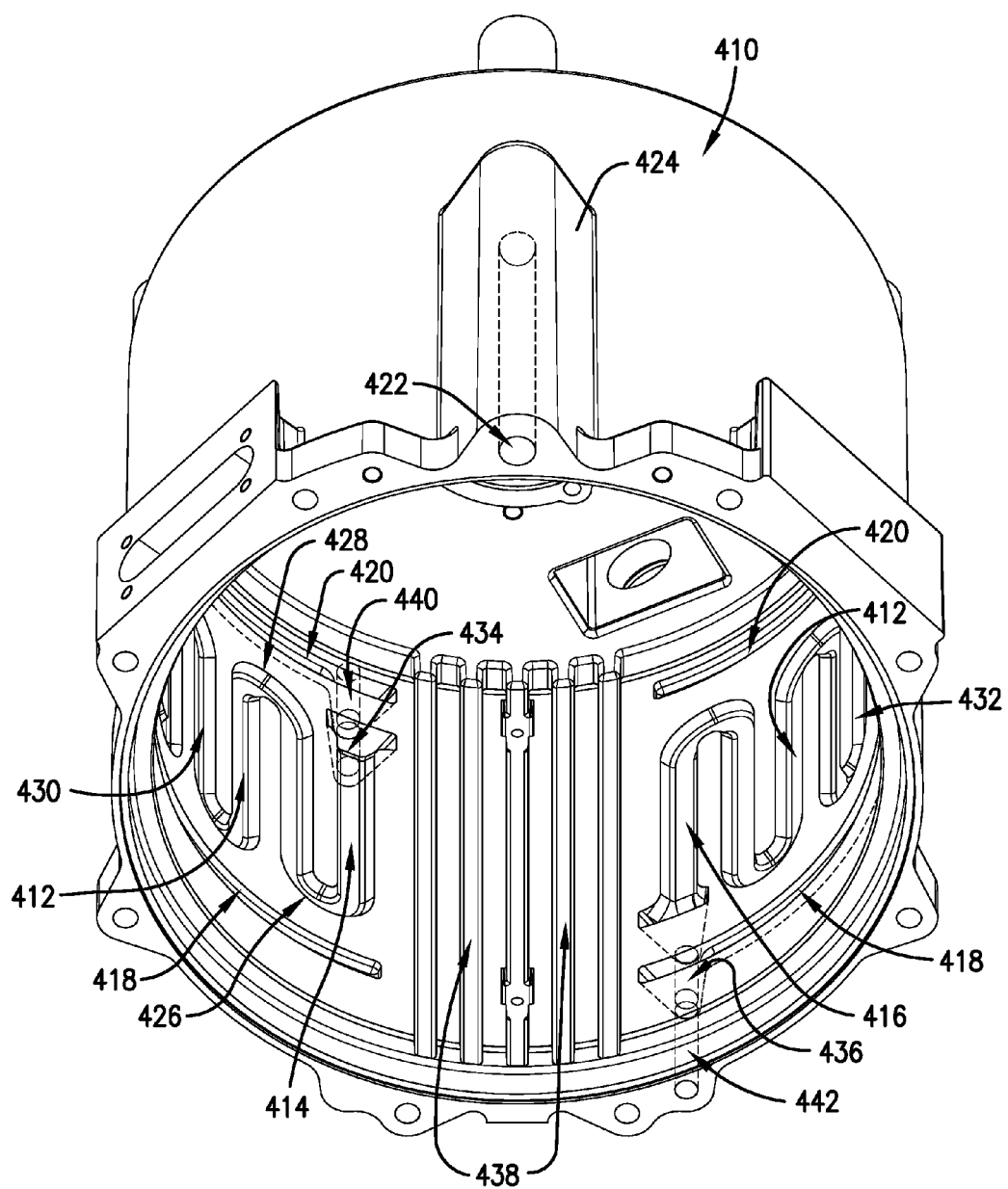
FIG. 26 is a front, top perspective view of a motor shell and a rear end plate in accordance with a third embodiment of the present invention.
Figure 27:
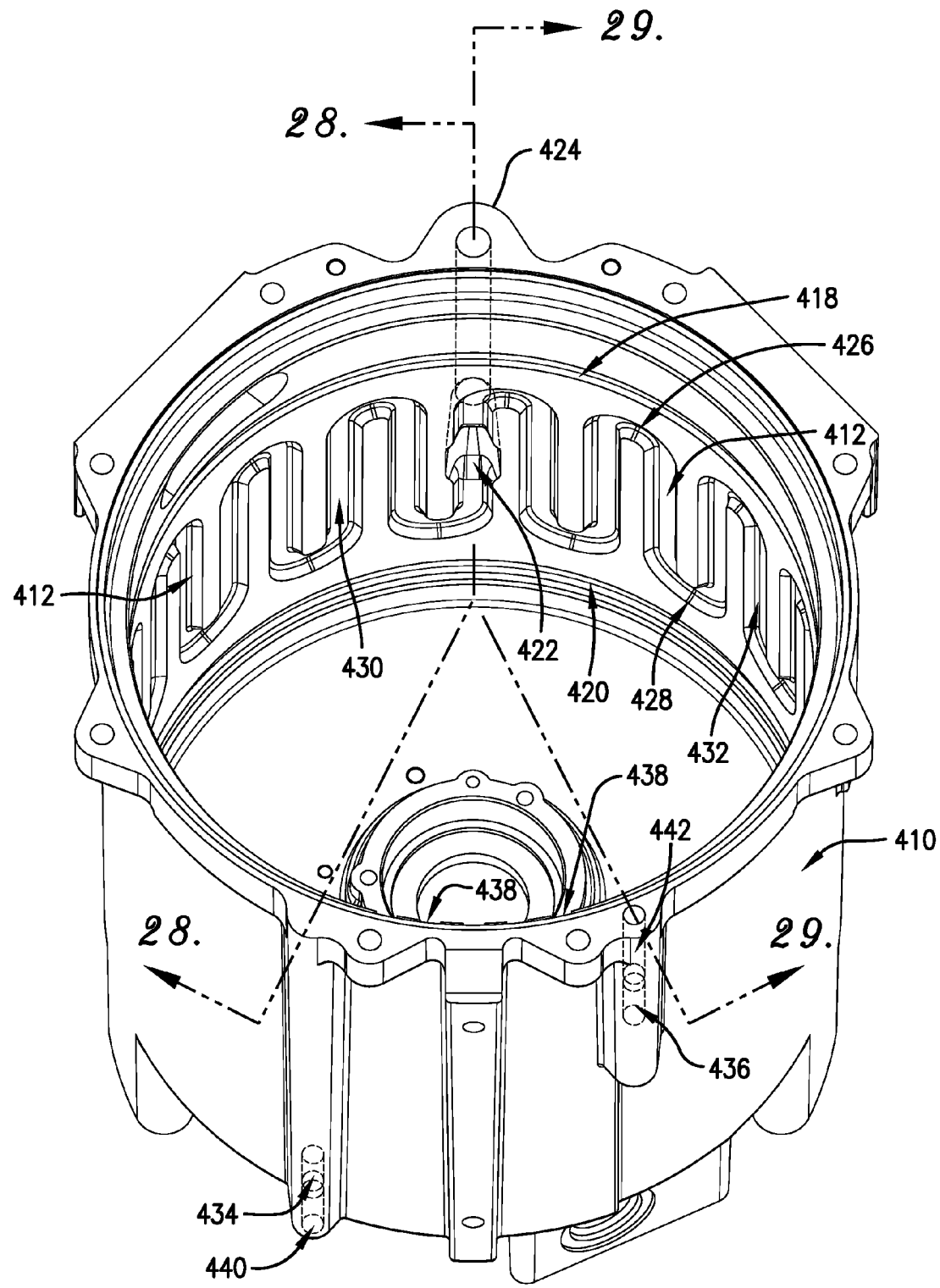
FIG. 27 is a front, bottom perspective view of the motor shell and rear end plate of FIG. 26.
Figure 28:
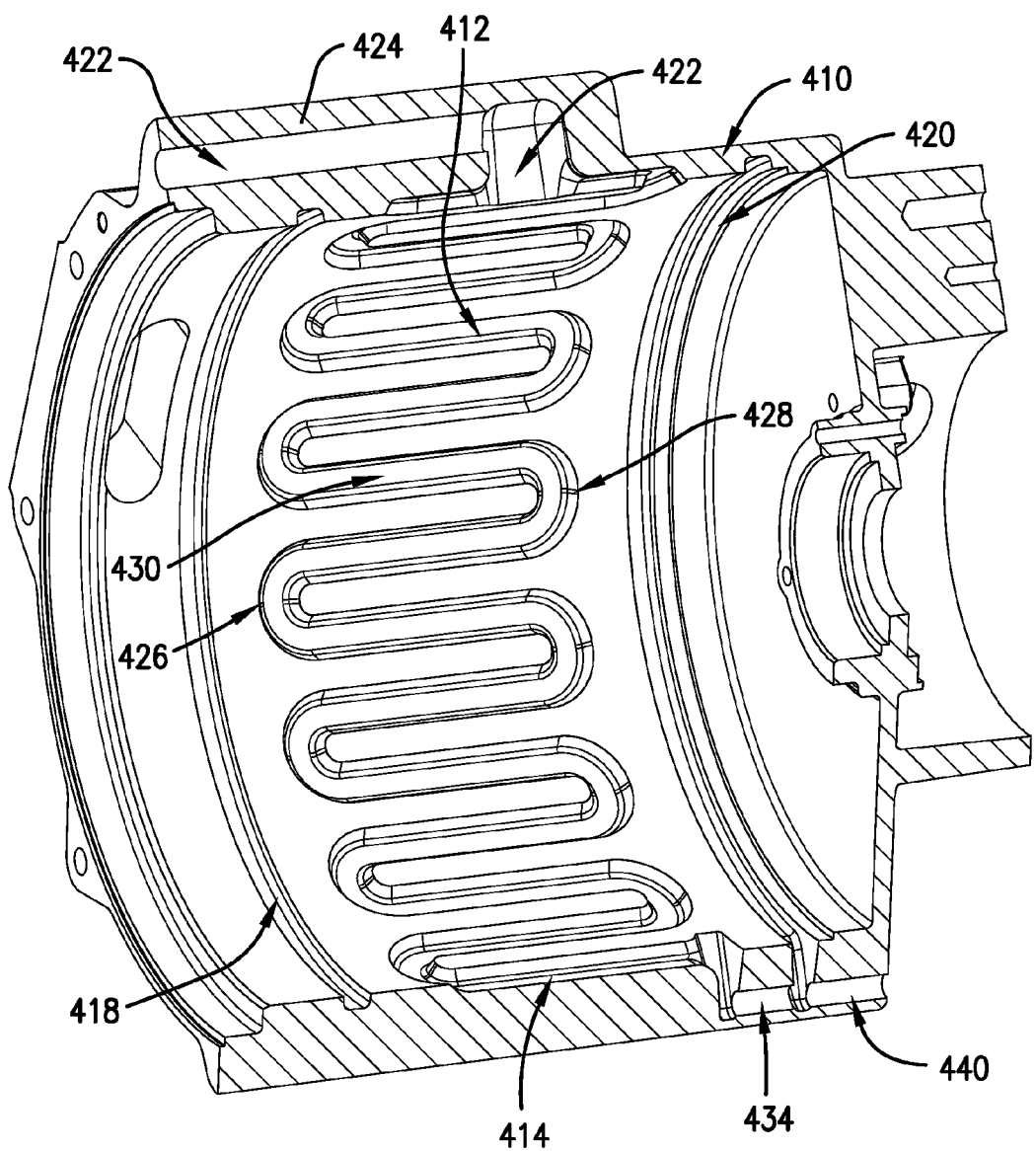
Figure 29:
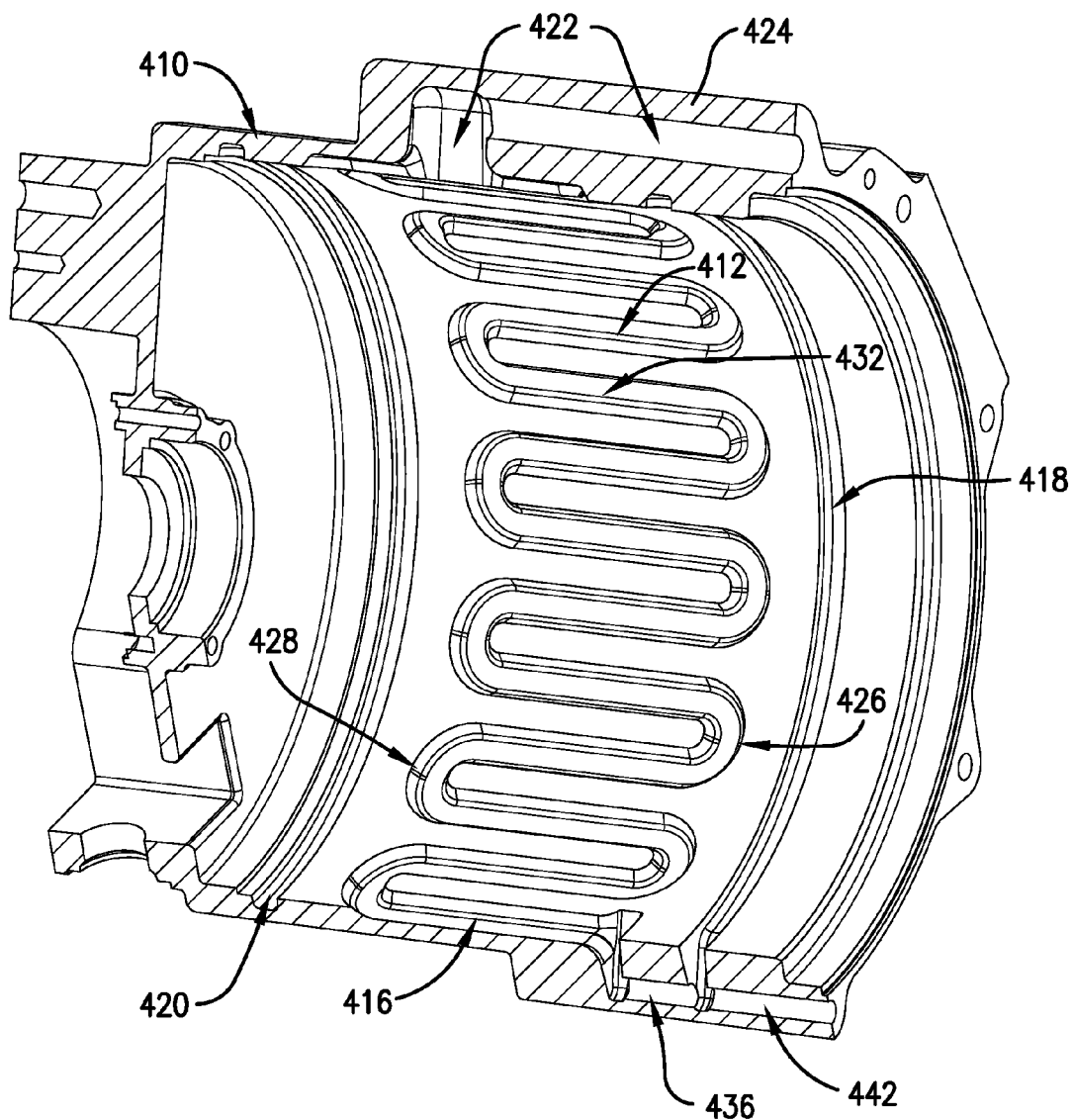

FIG. 28 is a cross-sectional side view of the motor shell and rear end plate of FIGS. 26 and 27, taken along line 28-28 of FIG. 27; and FIG. 29 is a cross-sectional side view of the motor shell and rear end plate of FIGS. 26-28, taken along line 29-29 of FIG. 27.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Motor Overview

Figure 1:
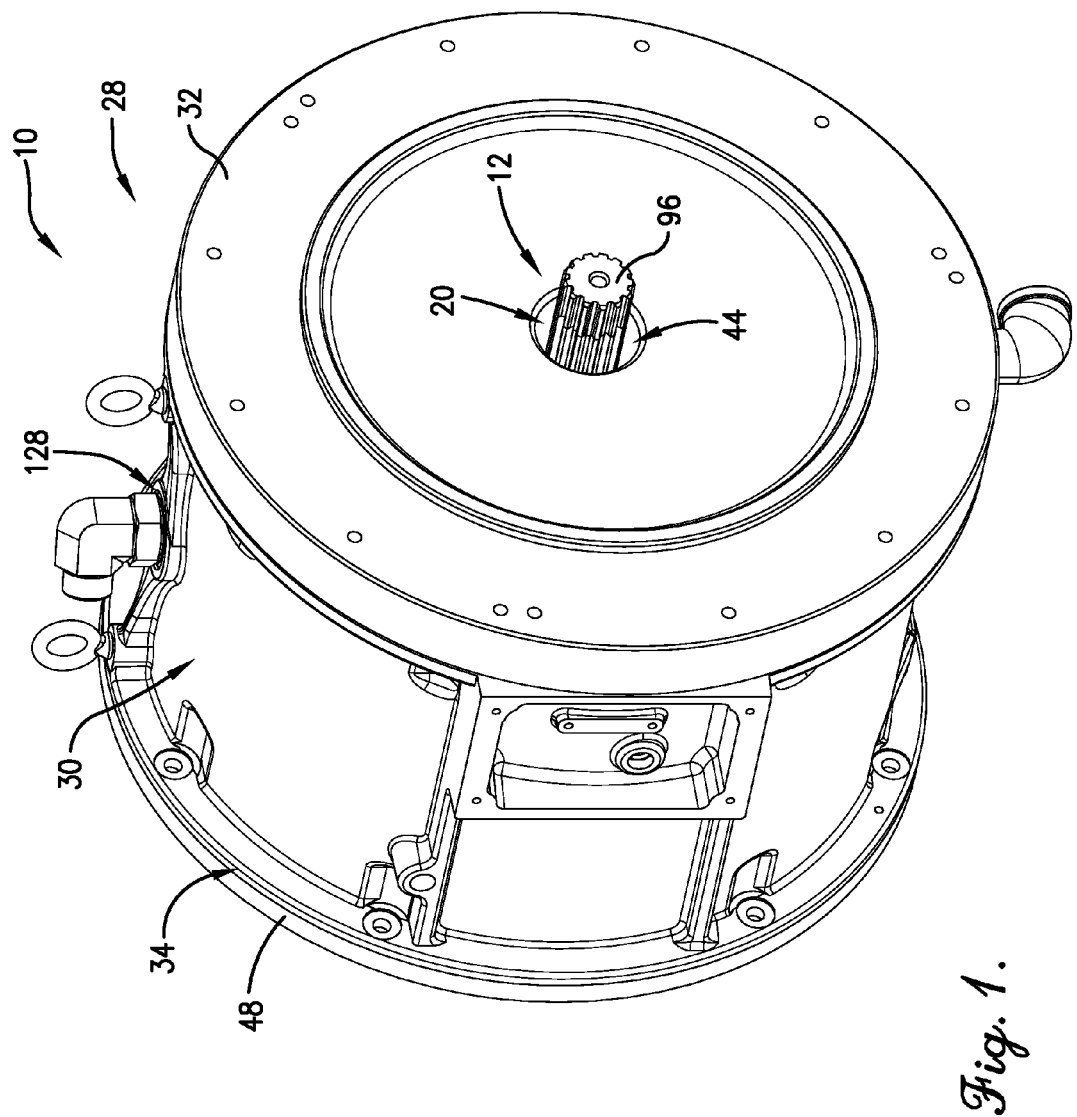
FIG. 1 is a front perspective view of a motor constructed in accordance with a preferred embodiment of the present invention.
Figure 2:
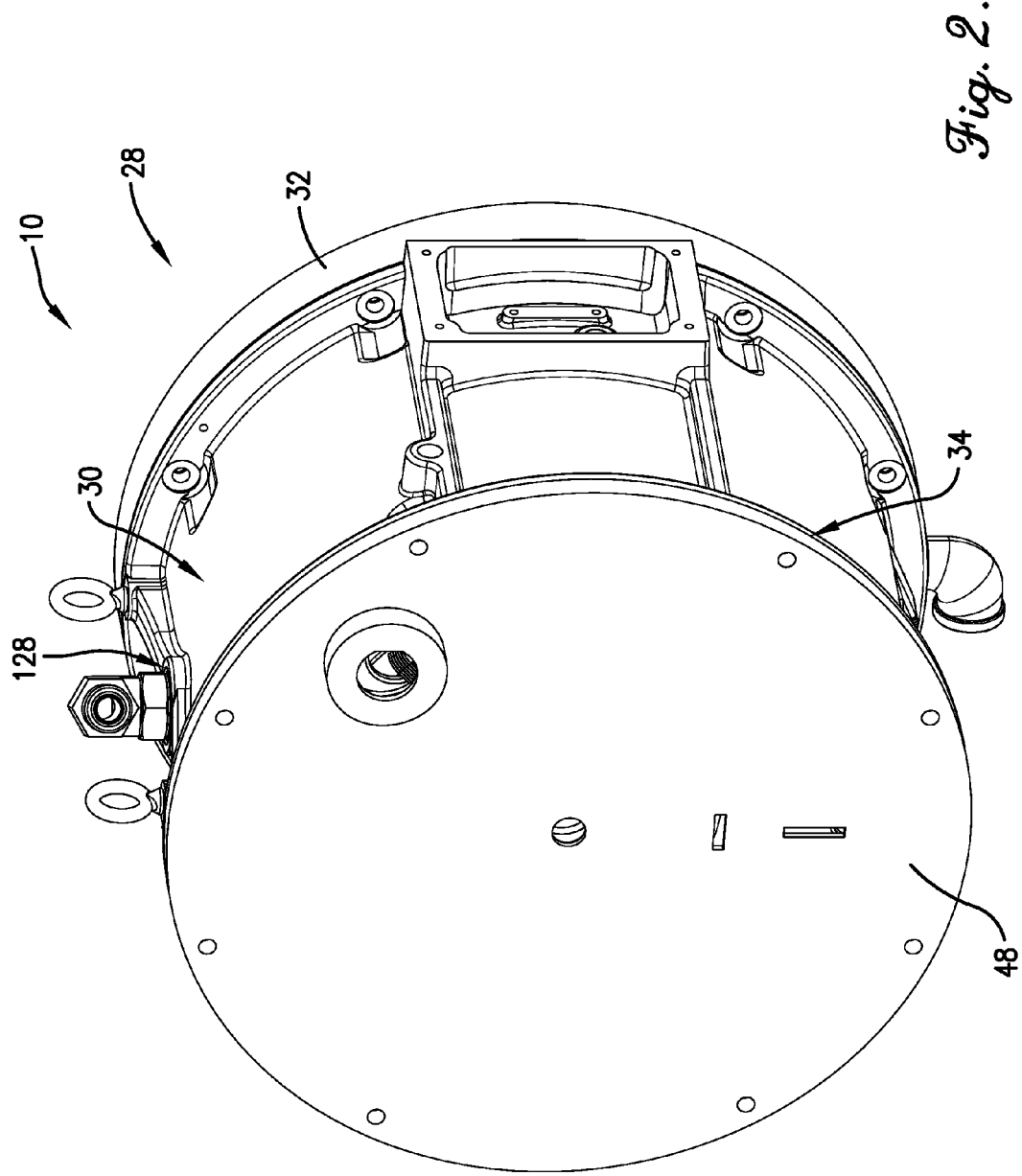
FIG. 2 is a rear perspective view of the motor of FIG. 1.
Figure 3:
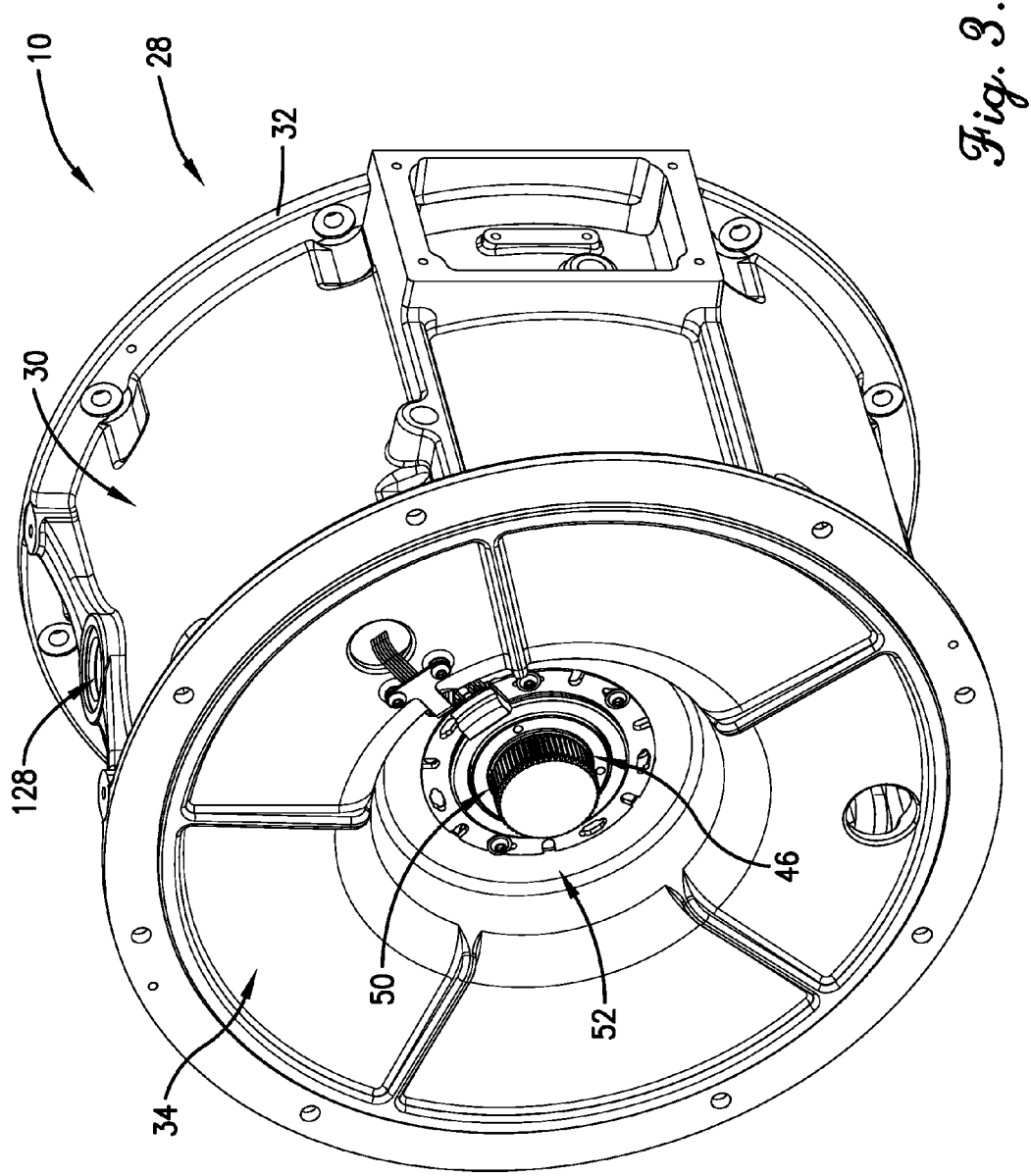
FIG. 3 is a rear perspective view of the motor of FIGS. 1 and 2, with the rear cover removed.
Figure 4:
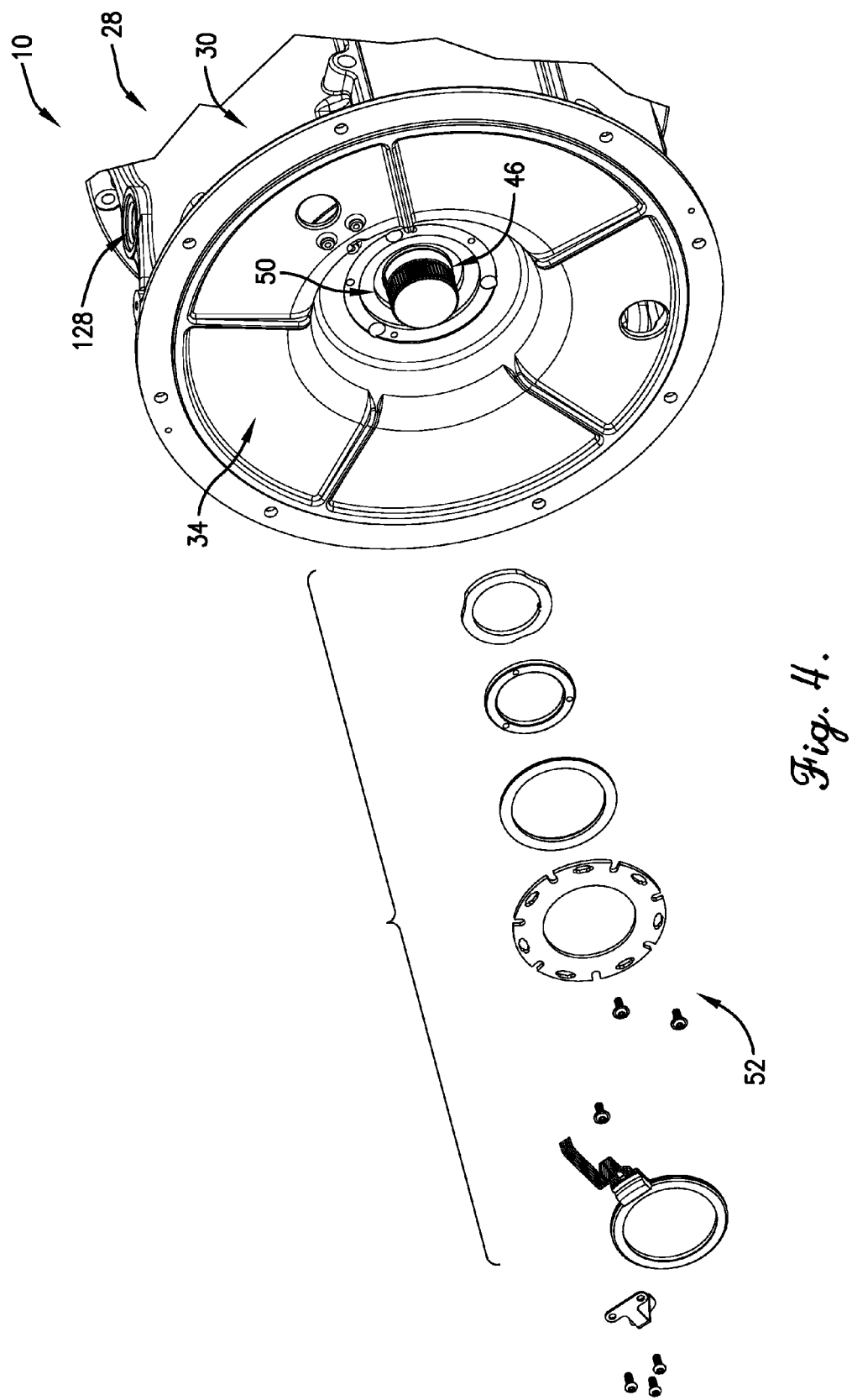
FIG. 4 is an exploded rear perspective fragmented view of the motor as shown in FIG. 3.
Figure 5:
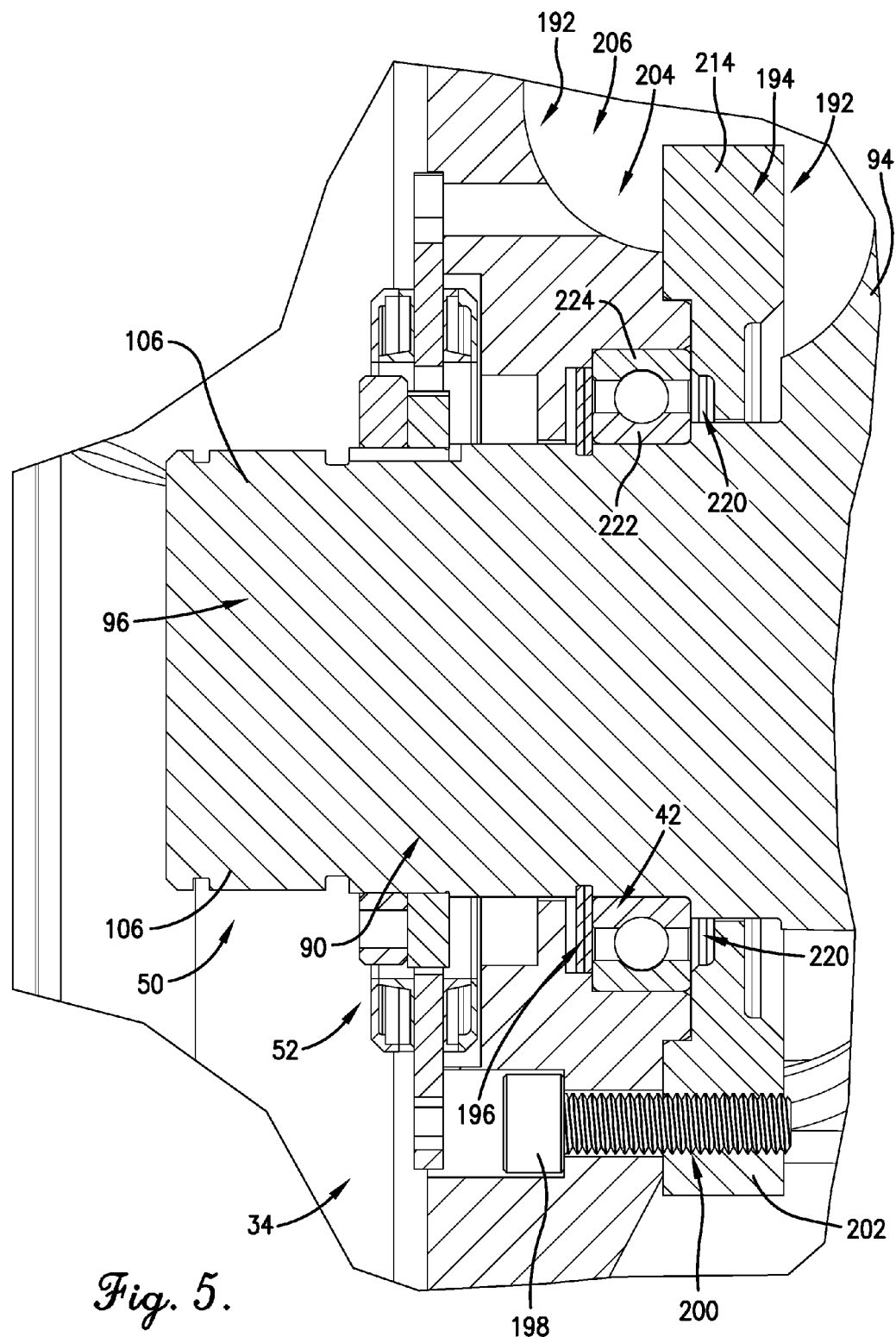
FIG. 5 is a fragmentary cross-sectional side view of the motor as shown in FIGS. 3 and 4.

With initial reference to FIGS. 1 and 2, an electric motor 10 is provided for use in a machine or appliance (not shown). More particularly, the motor 10 is preferably a traction motor used to propel a vehicle, such as a construction or agricultural self-propelled vehicle, although use of the motor in an alternative machine and/or application is permissible.

Figure 8:
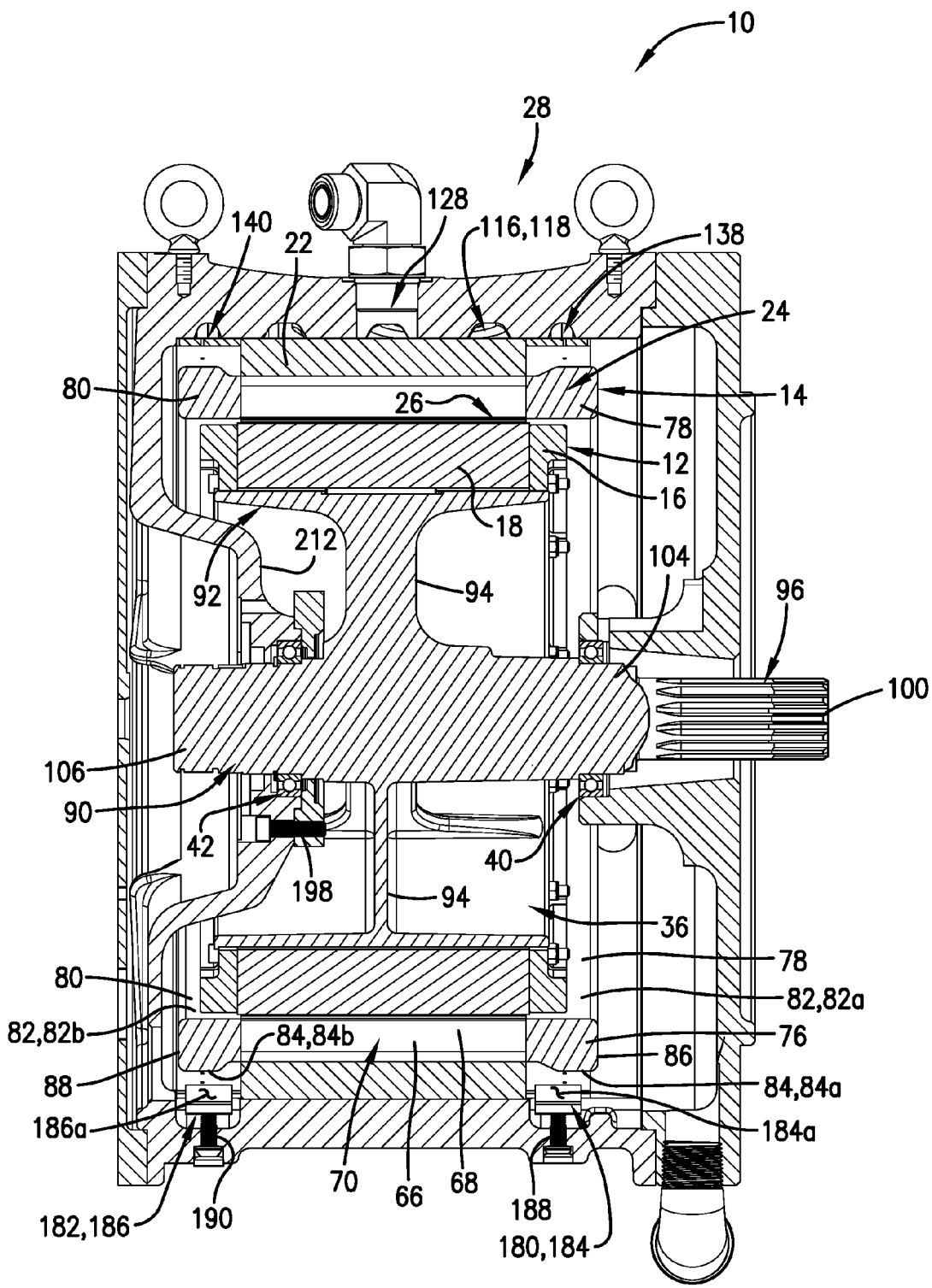
FIG. 8 is a cross-sectional side view of the motor of FIGS. 1-5.
Figure 9:
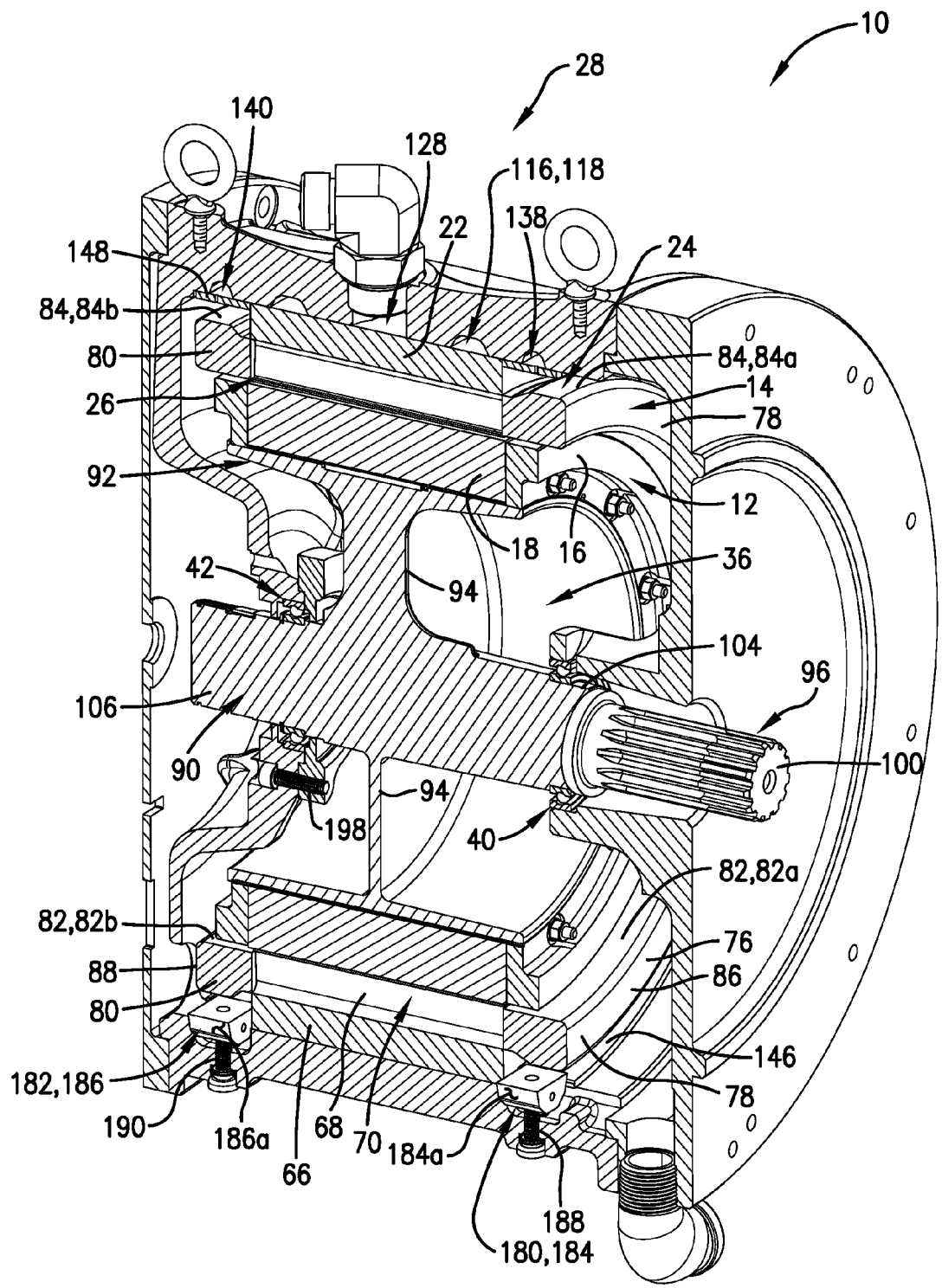
FIG. 9 is a cross-sectional front perspective view of the motor of FIGS. 1-5 and 8.
Figure 10:
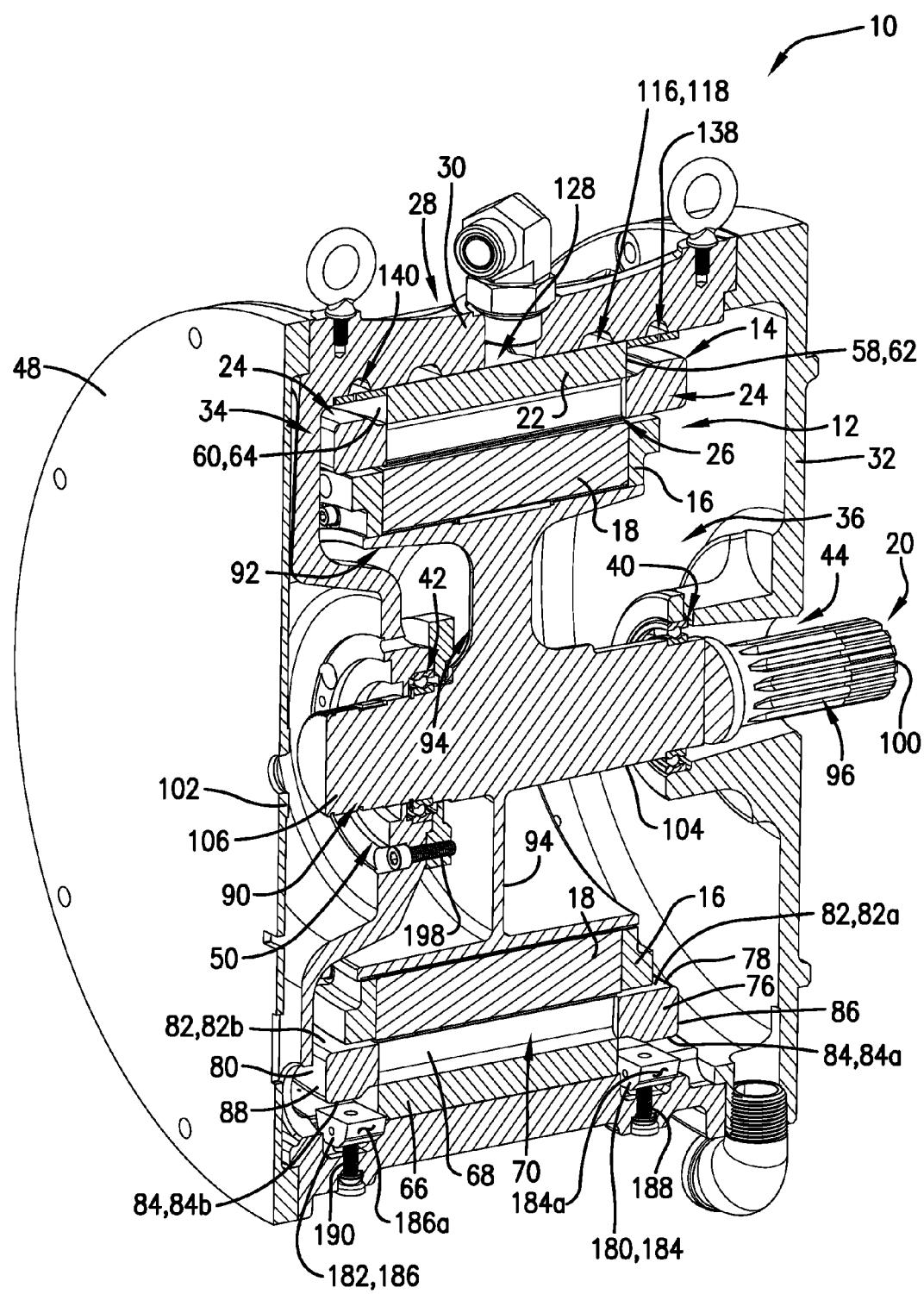
FIG. 10 is a cross-sectional rear perspective view of the motor of FIGS. 1-5, 8, and 9.

As best shown in FIGS. 8-10, the motor 10 broadly includes a rotor 12 and a stator 14. The rotor 12 is rotatable about an axis. In a preferred embodiment, as shown, the stator 14 at least substantially circumscribes the rotor 12, such that the motor 10 is an inner rotor motor. It is permissible according to some aspects of the present invention, however, for the motor to be an outer rotor motor or a dual rotor motor.

As will be discussed in greater detail below, the rotor 12 preferably includes a rotor core 16, a plurality of magnets 18, and a shaft assembly 20 defining a rotational axis for the rotor. In the preferred traction motor embodiment, the shaft assembly 20 is directly or indirectly coupled to one or more wheels (not shown) of the vehicle (also not shown).

As will also be discussed in greater detail below, the stator 14 preferably includes a stator core 22, an electrically insulative covering (not shown) on at least a portion of the stator core 22, and a plurality of windings or coils 24 (shown only schematically) wound about the stator core 22.

The rotor 12 and the stator 14 preferably define a thin, circumferentially extending gap 26 therebetween.

The motor 10 further preferably includes a housing 28. The housing 28 preferably includes a shell 30, a front end plate 32, and a rear end plate 34. The shell 30 and the front and rear end plates 32 and 34, respectively, preferably present a motor chamber 36 that at least substantially receives the stator 14 and the rotor 12.

In a preferred embodiment, the shell 30 extends generally circumferentially about the stator 14 to present an inner surface 38 that in part defines the motor chamber 36. It is permissible according to some aspects of the present invention, however, for the shell to extend in such a manner as to provide one or more flat sides, in contrast to the preferred generally cylindrical form, or to be otherwise alternatively shaped.

The shell 30 preferably extends generously continuously, such that the motor 10 is a closed motor. However, it is permissible according to some aspects of the present invention for the shell to include openings or slots therethrough. For instance, openings or slots may be provided for cooling, power and sensor connectiveness, and/or access purposes.

The front and rear end plates 32 and 34 preferably support respective front and rear bearing assemblies 40 and 42 that, in a broad sense, rotatably support the shaft assembly 20 and, in turn, the rotor 12. Alternative or additional bearing assembly supports or shaft assembly supports may be provided without departing from the scope of the present invention, however.

The front end plate 32 is preferably secured to the shell 30 via a plurality of fasteners (not shown). In contrast, the rear end plate 34 is preferably integrally formed with the shell 30. For instance, the rear end plate 34 and the shell 30 may suitably be formed during a single casting process. However, it is permissible according to some aspects of the present invention for the end plates and the shell to be interconnected by any means known in the art, including but not limited to integral interconnection or the use of fasteners, latches, press fits, and/or adhesives.

In a preferred embodiment, as illustrated, the end plates 32 and 34 define respective central openings 44 and 46 therethrough. Exclusive of such openings 44 and 46, however, the end plates 32 and 34 are preferably at least substantially solid in construction, such that ingress of contaminants therethrough is at least generally prohibited. It is permissible according to some aspects of the present invention, however, for either or both of the end plates to define cooling, power and sensor, and/or other types of openings therethrough.

The shell 30 and the end plates 32 and 34 preferably comprise aluminum, although other materials may be used without departing from the scope of some aspects of the present invention.

The shell 30 and the end plates 32 and 34 will be described in greater detail below.

Preferably, the motor 10 further includes an end cover 48 secured to the rear end plate 34. The cover 48 provides additional protection against ingress of contaminants into the motor chamber 36 and onto an exposed portion 50 of the rotor 12 that extends out of the motor chamber 36 through the rear end plate 34.

Yet further, the motor 10 includes a plurality of control components broadly denoted by reference numeral 52. Control components 52 may be of any type or configuration required for the particular motor application.

Stator

As noted previously, the stator 14 preferably includes the stator core 22, an electrically insulative covering (not shown) on at least part of the stator core 22, and the plurality of windings or coils 24 wound about the stator core 22.

In a preferred embodiment, the stator 14 is generally toroidal in form. The stator core 22 is likewise preferably generally toroidal in form and defines an axis of the stator 14. Preferably, the axis of the stator 14 is coaxial with that of the rotor 12. However, it is permissible according to some aspects of the present invention for the axes to be non-coaxial.

The stator core 22 is preferably a laminated stator core comprising a plurality of axially stacked laminations (not shown). However, it is permissible for the stator core to be a solid stator core without departing from the scope of the present invention.

The stator core 22 preferably comprises steel. However, it is permissible without departing from the scope of the present invention for any one or more of a variety of suitable materials to be used for the stator core.

Figure 11:
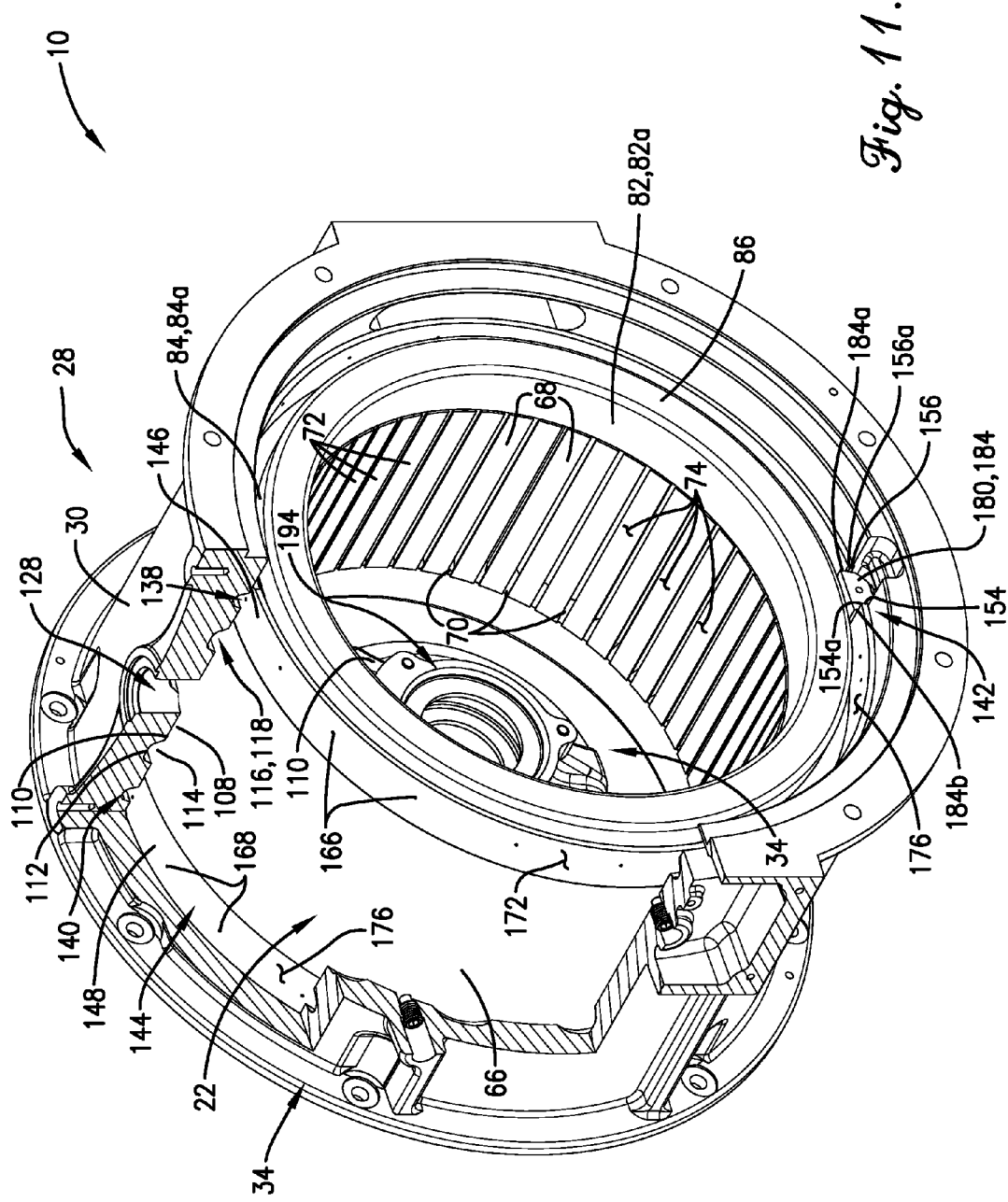
FIG. 11 is a front perspective view of the motor shell, stator, spray rings, rear end plate, and bearing cap of the motor of FIGS. 1-5 and 8-10.
Figure 12:
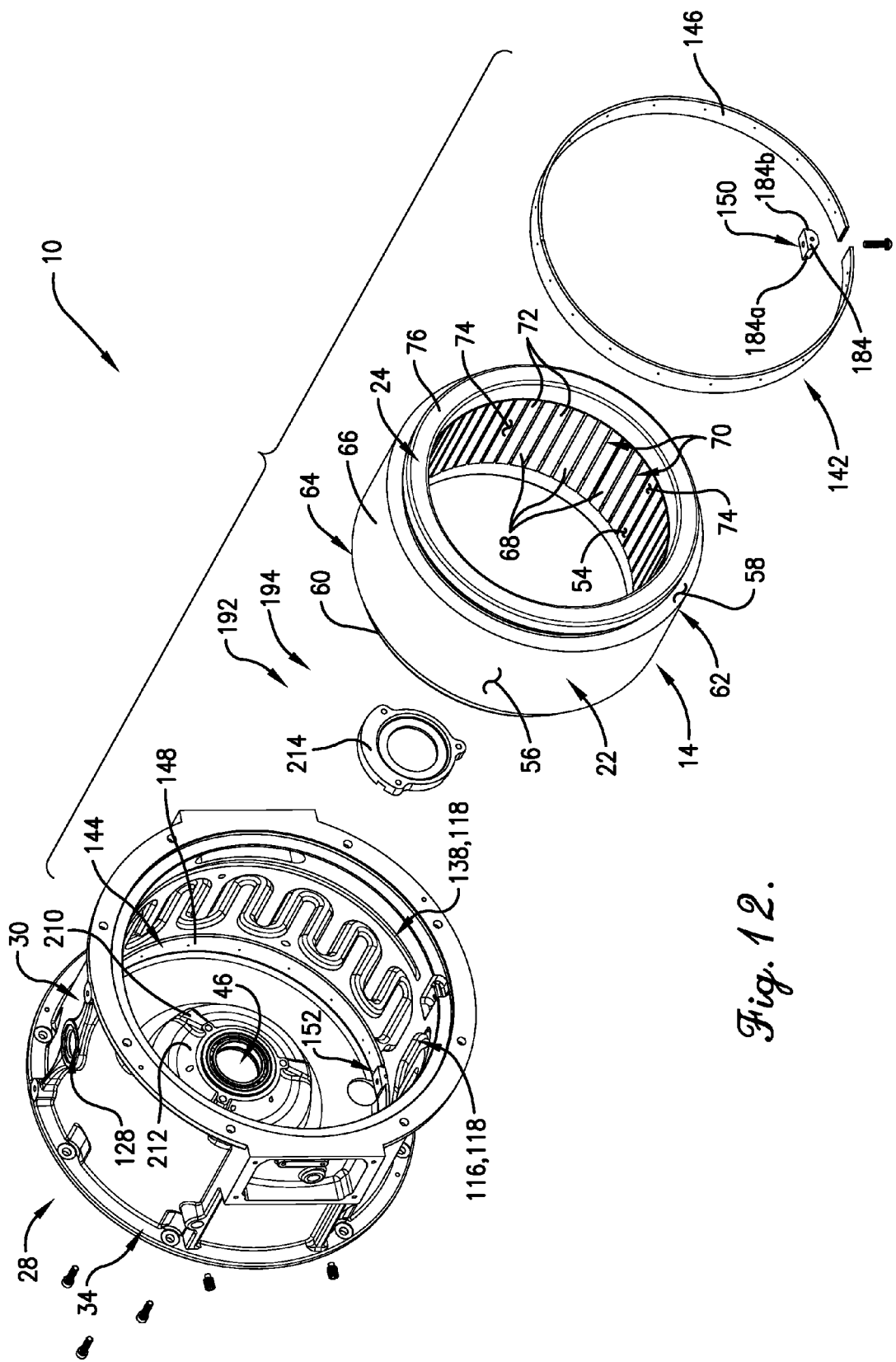
FIG. 12 is an exploded front perspective view of the motor shell, stator, spray rings, rear end plate, and bearing cap of the motor as shown in FIG. 11.
Figure 15:
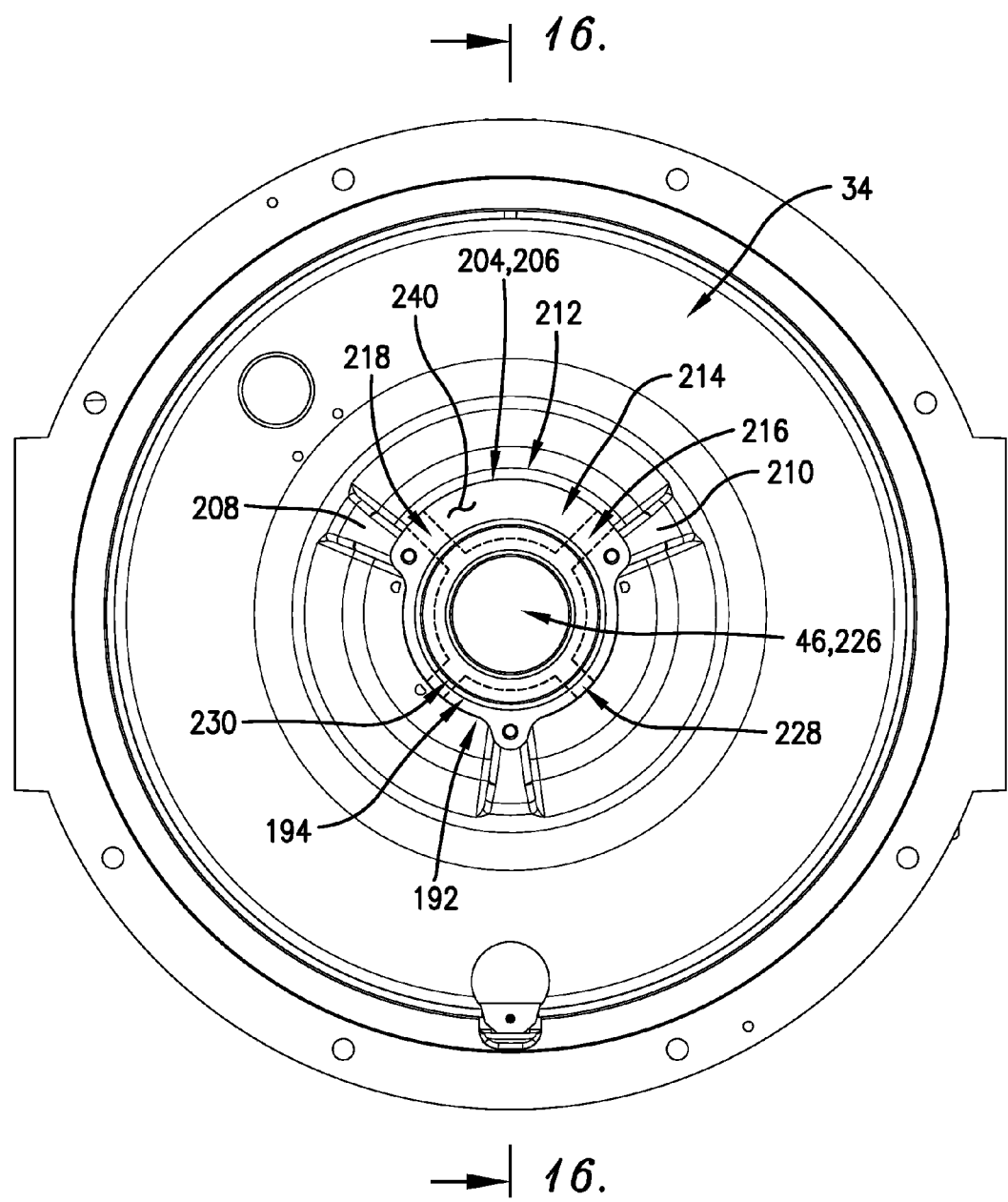
FIG. 15 is a front view of the motor shell, rear end plate, spray rings, and bearing cap of FIGS. 1-5 and 8-11.

As best shown in FIGS. 11 and 12, the stator core 22 preferably presents a radially inner circumferential surface 54 defining an inner core diameter and a radially outer circumferential surface 56 defining an outer core diameter. Furthermore, the stator core 22 preferably presents a pair of opposite, axially spaced apart front and rear end faces 58 and 60 defining corresponding front and rear axial margins or ends 62 and 64 of the stator core. The end faces 58 and 60 are preferably at least substantially planar and parallel with each other, although non-parallel and/or non-planar surfaces are permissible according to some aspects of the present invention.

The stator core 22 preferably includes an annular yoke 66 and, as best shown in FIGS. 11 and 12, a plurality of arcuately spaced apart teeth 68 extending at least generally radially from the yoke 66. Each pair of adjacent teeth 68 preferably defines a slot 70 therebetween. Preferably, in keeping with the preferred inner rotor motor design, the teeth 68 extend radially inwardly from the yoke 66, although it is permissible according to some aspects of the present invention for the teeth to extend generally outwardly (e.g., in the case of an outer rotor motor). Each tooth 68 preferably includes a generally radially extending arm (not shown) and a generally arcuately extending crown 72 extending from one end of the arm. Each crown 72 preferably presents a circumferential crown face 74 spaced opposite the yoke 66. The circumferential crown faces 74 preferably cooperatively define the inner circumferential surface 54 of the stator core 22. The inner circumferential surface 54 of the stator core 22 is thus preferably discontinuous.

As noted previously, although the above-described inner rotor motor design is preferred, it is permissible according to some aspects of the present invention for the motor to alternatively be an outer rotor motor. In such an alternative embodiment, the teeth would instead extend generally radially outwardly from yoke, with the crown faces therefore cooperatively defining a discontinuous outer circumferential surface of the stator core. In an alternative dual rotor motor design, teeth would extend both generally radially inwardly and generally radially outwardly from the yoke, with both the inner and outer circumferential surfaces of the stator core being discontinuous.

The coils 24 preferably comprise electrically conductive wiring 76 wound about the stator core 22. The wiring 76 is preferably wound about each of the teeth 68 through the slots 70 to form the coils 24, with each of the coils 24 corresponding to one of the teeth 68. More particularly, the wiring 76 is preferably wound about each arm so as to encircle the arm and form the coils 24. The coils 24 each thus extend in part past the axial ends 62 and 64 of the stator core 22. More particularly, each coil 27 presents front and rear end turns 78 and 80, respectively, positioned adjacent respective ones of the ends 62 and 64 of the stator core 22.

Preferably, each coil 24 presents a radially innermost side 82, a radially outermost side 84, and a pair of axially spaced apart front and rear endmost sides 86 and 88. Each innermost side 82 preferably includes a pair of axially spaced apart frontmost and rearmost regions 82a and 82b. Similarly, each outermost side 84 preferably includes a pair of axially spaced apart frontmost and rearmost regions 84a and 84b. The front endmost side 86 extends between and interconnects the frontmost regions 82a and 84a such that the front endmost side 86 and the frontmost regions 82a and 84a cooperatively form the front end turn 78. Similarly, the rear endmost side 88 extends between and interconnects the rearmost regions 82b and 84b such that the rear endmost side 88 and the rearmost regions 82b and 84b cooperatively form the rear end turn 80.

The wiring 76 preferably comprises copper, although aluminum or any one or more of a variety of electrically conductive materials may be used without departing from the scope of the present invention.

The wiring 76 is preferably wound in such a manner that the motor 10 is a three (3) phase motor. Alternative phasing is permissible within the scope of the present invention, however.

As noted previously, an insulative covering (not shown) is preferably provided on the stator core 22. The covering preferably comprises an at least substantially electrically insulative material. For instance, the covering may comprise a synthetic resin material. However, any one or more of a variety of substantially electrically insulative materials may be used without departing from the scope of the present invention. Furthermore, use of any one or more of a variety of insulation means, including but not limited to the use of electrically insulative overmolding, powder-coating, inserts, and/or liners, is permissible according to some aspects of the present invention. It is also permissible according to some aspects of the present invention for the stator core to be devoid of electrical insulation. The insulative covering preferably covers only part of the core. For example, it is often common for the crown face 74 of each tooth 68 to be exposed (i.e., devoid of the insulative covering). It is permissible, however, for the covering to fully encapsulate the stator core according to certain aspects of the present invention.

Rotor

As briefly discussed above, the rotor 12 preferably includes the rotor core 16, the plurality of magnets 18, and the shaft assembly 20.

In more detail, as best shown in FIGS. 8-10, the shaft assembly 20 preferably includes an inner hub 90, an outer support ring 92, a connecting plate 94 extending between and interconnecting the hub 90 and the support ring 92, and a shaft 96 including a connection end 100.

The hub 90 and the shaft 96 may be integrally formed, as illustrated. Alternatively, the hub and shaft may be discrete components interconnected to each other in any suitable manner such that rotation of the hub and the shaft occurs simultaneously. For instance, the hub might be at least in part tubular so as to define a hub opening that receives a discrete shaft and fixes the shaft relative to the hub, such that the shaft and the hub rotate in concert.

The hub 90 preferably includes a front end 104 and a rear end 106. The rear end 106 of the hub 90 preferably extends through the opening 46 in the rear end plate 34, while the shaft 96 and the front end 104 of the hub 90 preferably extends through the opening 44 in the front end plate 32.

The hub 90, the connecting plate 94, and the support ring 92 are preferably integrally formed. More particularly, the hub 90, the connecting plate 94, and the support ring 92 are preferably formed of cast iron via a single casting process. It is permissible according to some aspects of the present invention, however, for the hub, the connecting plate, and/or the support ring to comprise any one or more of a variety of materials. For instance, aluminum or a high-strength synthetic resin might be used. Furthermore, it is permissible according to some aspects of the present invention for the hub, the connecting plate, and/or the support ring to be discrete components interconnected by any means known in the art, including but not limited to fasteners, latches, and/or adhesives.

Preferably, the rotor core 16 circumscribes and is supported on the hub 90. The magnets 18 are preferably permanent magnets embedded in or otherwise fixed relative to (e.g., via adhesives or glues) the rotor core 16. It is permissible according to some aspects of the present invention, however, for alternative rotor configurations to be used. For instance, the rotor could alternatively include a plurality of pole segments alternately arcuately arranged with a corresponding plurality of permanent magnets.

Motor Shell and Spray Ring Assemblies

As noted previously, the motor shell 30 preferably extends generally circumferentially about the stator 14. Furthermore, the shell 30 preferably cooperates with the front and rear end plates 32 and 34, respectively, to present the motor chamber 36. More particularly, the shell 30 preferably defines the inner surface 38 that in part defines the motor chamber 36.

In a preferred embodiment, the outer circumferential surface 56 of the stator core 22 includes an interface region 108. The inner surface 38 of the shell 30 preferably includes a corresponding interface portion 110 that directly engages (i.e., abuts) the interface region 108 of the stator core 22.

The inner surface 38 of the shell 30 further preferably includes a coolant-routing portion 112 adjacent the interface portion 110. The coolant-routing portion 112 is preferably recessed relative to the interface portion 110, although non-recessed embodiments are permissible according to some aspects of the present invention.

The coolant-routing portion 112 is preferably opposed to and generally spaced from a corresponding coolant-routing region 114 defined along the outer circumferential surface 56 of the stator core 22 and adjacent the interface region 108. The coolant-routing region 114 is preferably not recessed relative to the interface region 108, although recessed embodiments are permissible according to some aspects of the present invention.

The coolant-routing portion 112 and the coolant-routing region 114 preferably cooperatively define a stator-cooling passage 116 that defines a portion of a larger flow path 118 for a coolant. (Other portions of the flow path 118 will be described in detail below). Preferably, flow of a coolant through the stator-cooling passage 116 along the flow path 118 enables dissipation of heat associated with operation of the motor 10.

Although it is preferred that the stator-cooling passage 116 is formed by a recessed coolant-routing portion 112 and a non-recessed coolant-routing region 114, as described above, alternative configurations are permissible. For instance, the coolant-routing portion might be non-recessed, while the coolant-routing region is recessed; both the coolant-routing portion and the coolant-routing region might be recessed; or the coolant-routing portion and the coolant-routing region might be alternately recessed and non-recessed in coordination with each other so as to define a three-dimensional stator-cooling passage.

The coolant may be any fluid known in the art. For instance, the coolant might be a liquid such as water or a gas such as air. The coolant might also comprise a plurality of solid particles that collectively behave in a generally fluid-like manner (e.g., via flowing). Furthermore, as will be discussed in greater detail below, the coolant is preferably additionally be operable as a lubricant (e.g., for the front and rear bearing assemblies 40 and 42, respectively). Most preferably, the coolant comprises oil.

The stator-cooling passage 116 is preferably generally tortuous in form so as to increase the distance traveled by coolant flowing therethrough and therefore increase the heat-absorption and/or -dissipation effects had by the coolant. In a preferred embodiment, as illustrated, for instance, the stator-cooling passage 116 includes a plurality of fluidly interconnected, generally S-shaped portions. More particularly, the stator-cooling passage 116 preferably comprises a plurality of circumferentially spaced apart, generally straight, generally axially extending lateral portions 120 interconnected by axially spaced part, generally curved, generally circumferentially extending turns 122. The turns 122 redirect the flow such that a coolant in the stator-cooling passage 116 flows in an opposite direction in each adjacent lateral portion 120. Preferably, a plurality of turns 122 are provided such that the coolant changes direction multiple times along the flow path 118.

Although the above-described curved, S-shaped configuration is preferred, it is permissible according to some aspects of the present invention for the stator-cooling passage to be alternatively shaped. The passage could, for instance, take an angularly zig-zagged form, comprise circumferentially spaced apart sets of axially oriented S-shaped segments, include square turns rather than the illustrated curved turns, comprise one or more circumferentially extending helical spirals, etc. In addition, the motor may alternatively be provided with multiple discrete cooling passages rather than just the single passage shown.

Preferably, the stator-cooling passage 116 is generally regular in its configuration (e.g., equal and/or repeatable spacing between lateral portions 120, constant axial span, general symmetry, etc.). Irregular passages are permissible according to some aspects of the present invention, however.

Preferably, the stator-cooling passage 116 is axially centered between the ends 62 and 64 of the stator core 22. Non-centered (i.e., offset) configurations are permissible according to some aspects of the present invention, however.

Furthermore, in keeping with the desired heat-dissipation functionality, it is also preferred that the stator-cooling passage 116 spans at least a substantial axial portion of the stator core 22 between the front and rear ends 62 and 64, respectively. More particularly, in a preferred embodiment, the stator-cooling passage 116 presents front and rear margins 124 and 126, respectively, spaced apart an axial distance such that the stator-cooling passage 116 spans at least half the axial length of the stator core 22 (wherein the axial length of the stator core is understood to be an axial distance between the front and rear ends 62 and 64). More preferably, the stator-cooling passage 116 spans at least two thirds of the axial length of the stator core 22. Most preferably, the stator-cooling passage 116 spans about three quarters or more of the axial length of the stator core. Lesser axial spans are permissible according to some aspects of the present invention, however.

Additional features configured to influence flow through the stator-cooling passage 116 may also be provided. For instance, turbulence-generating flow disruptors (not shown) might extend into the flow path.

Figure 6:
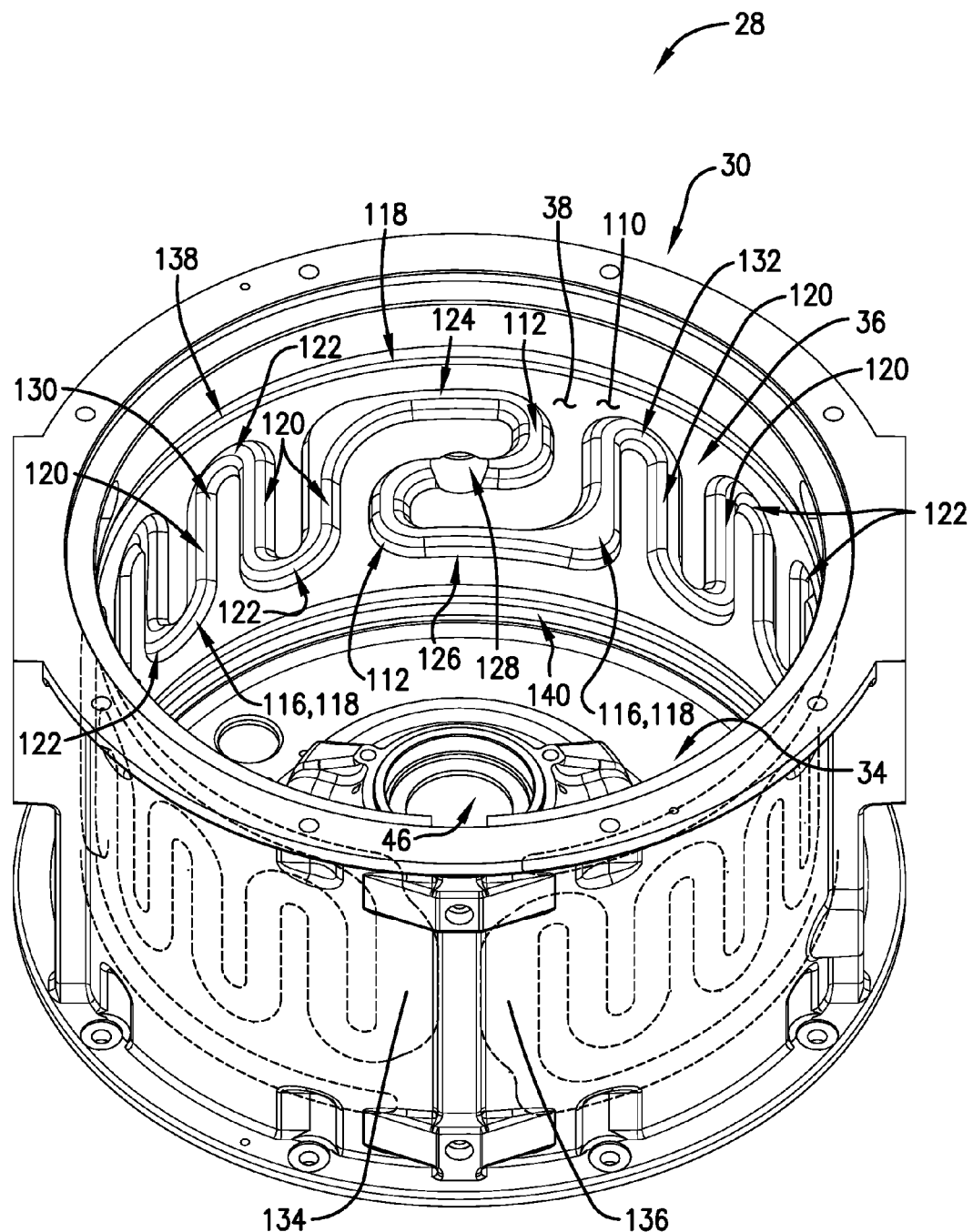
FIG. 6 is a front, bottom perspective view of the motor shell and rear end plate of the motor of FIGS. 1-5.
Figure 7:
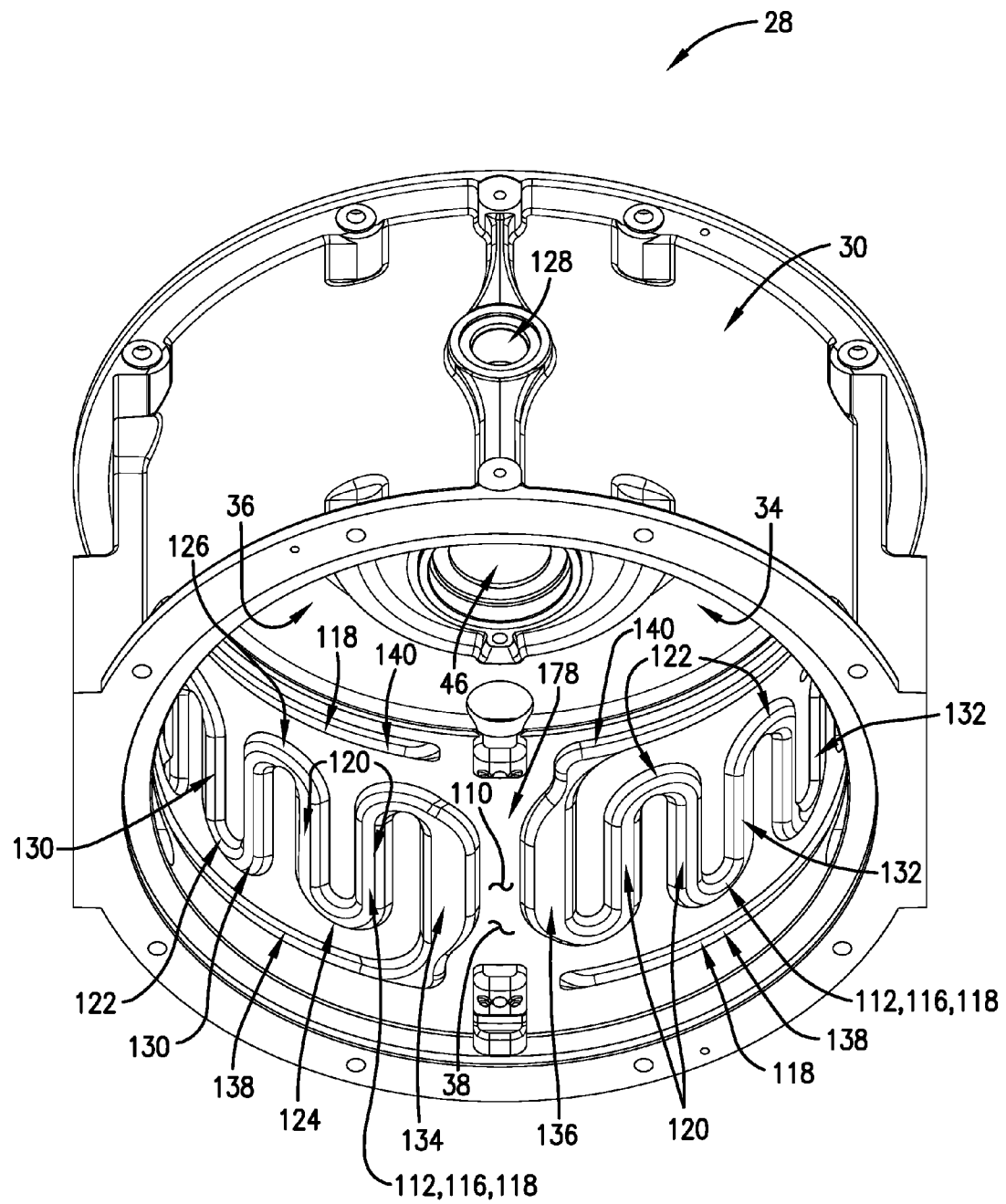
FIG. 7 is a front, top perspective view of the motor shell and rear end plate as shown in FIG. 6.
Figure 7A:
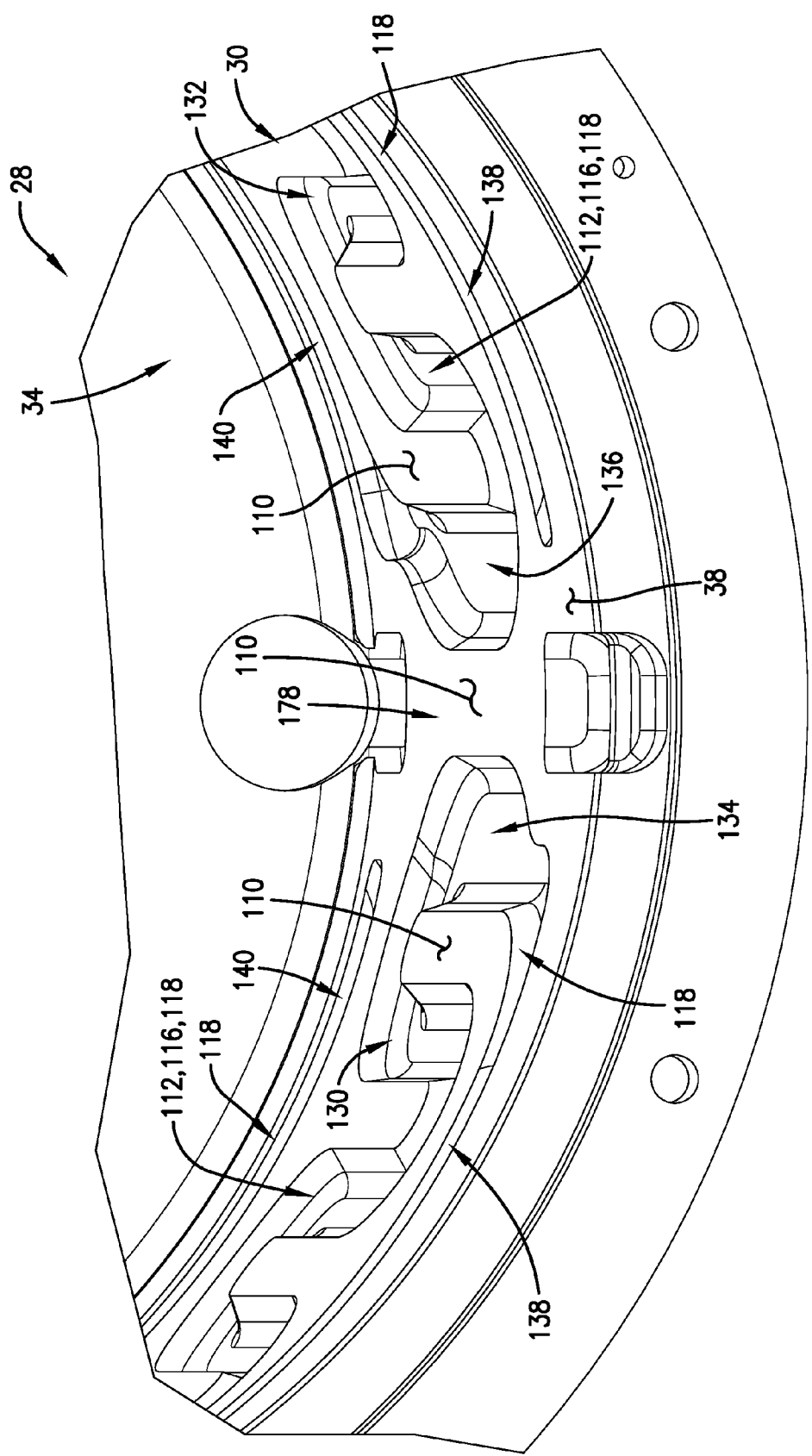
FIG. 7a is an enlarged, fragmentary view of a portion of the motor shell and rear end plate as shown in FIG. 7.

Preferably, the housing 28 defines a coolant inlet 128, best shown in FIGS. 6 and 7, through which coolant enters the stator-cooling passage 116. The inlet 128 is preferably centered between the front and rear margins 124 and 126 of the stator-cooling passage 116, although offset configurations are permissible according to some aspects of the present invention.

Coolant entering the stator-cooling passage 116 through the inlet 128 preferably flows in part in a first circumferential direction through a first branch 130 of the stator-cooling passage 116 and in part in a second circumferential direction through a second branch 132 of the stator-cooling passage 116. That is, the flow path 118 is unitary at the inlet 128 but thereafter diverges in circumferentially opposite directions such that the coolant flows about opposite sides of the stator core 22. This configuration minimizes stress conditions in and adjacent the coolant inlet 128 that occur due to interference between the stator core 22 and the shell 30 (more particularly, between the interface region 108 of the outer circumferential surface 56 of the stator core 22 and the interface portion 110 of the inner surface 38 of the shell 30). Such a configuration is particularly advantageous in a preferred embodiment in which a significant degree of interference is required between the core 22 and the shell 30 at lower temperatures to maintain interference at high temperatures (e.g., when the shell 30 comprises aluminum and the stator core 22 comprises steel).

The shell 30 and the stator core 22 further cooperatively define collection areas 134 and 136 downstream of and fluidly interconnected with the portions of the flow path 118 defined by respective ones of the branches 130 and 132. More particularly, the collection areas 134 and 136 are preferably positioned generally adjacent each other and generally diametrically opposed to the inlet 128. Coolant must therefore flow through the inlet 128 and around at least substantially half the circumference of the stator core 22 through one of the branches 130 or 132 of the stator-cooling passage 116 to reach the corresponding one of the collection areas 134 and 136.

Similar to the stator-cooling passage 116, the collection areas 134 and 136 are preferably cooperatively defined by the coolant-routing portion 112 of the shell 30 and the coolant-routing region 114 of the stator core 22. As discussed above with respect to the stator-cooling passage 116, however, alternative means of defining the collection areas are also permissible.

The shell 30 further in part defines a pair of coolant-directing conduits 138 and 140 downstream of and fluidly interconnected with corresponding ones of the collection areas 134 and 136. More particularly, as will be described in greater detail below, the motor 10 preferably includes a pair of axially spaced apart spray ring assemblies 142 and 144 that cooperate with the coolant-routing portion 112 of the shell 30 to define respective ones of the conduits 138 and 140.

As best shown in FIGS. 11, 12, 16, and 18, each spray ring assembly 142,144 comprises a respective spray ring 146,148 and a corresponding respective ring deflector 150,152. Each spray ring 146 and 148 at least substantially overlies a corresponding portion of the coolant-routing portion 112 to cooperatively define a corresponding one of the coolant-directing conduits 138 and 140.

The spray ring 146 extends generally arcuately and presents first and second arcuately spaced apart ends 154 and 156 defining an arcuate gap 158 therebetween. Similarly, the spray ring 148 extends generally arcuately and presents first and second arcuately spaced apart ends 160 and 162 defining an arcuate gap 164 therebetween.

Each spray ring 146,148 preferably comprises a resiliently deformable material or materials (e.g., stainless steel) and is expandable or contractible via modification of the size of the respective gap 158 or 164. Such expandability and contractibility enables simplified assembly and disassembly of the motor 10 and, particularly, the placement of the spray ring assemblies 142 and 144.

Furthermore, such expandability and contractibility allows for sufficient pressure to be developed between the outer faces 172 and 176 of the spray rings 146 and 148, respectively, and the inner surface 38 of the shell 30 to seal corresponding ones of the coolant-directing conduits 138 and 140, thereby at least substantially preventing coolant leakage.

Preferably, each spray ring 146,148 defines a corresponding plurality of orifices 166 or 168 therethrough. As best shown in FIGS. 11 and 16-19, the orifices 166 and the orifices 168 are preferably arcuately spaced apart, positioned in alignment with each other, and slightly outwardly offset (in an axial direction relative to the motor 10 as a whole) from an arcuately extending centerline of the corresponding spray ring 146 or 148. It is permissible according to some aspects of the present invention, however, for the orifices to be alternatively arranged. The orifices might be provided in a grid format or randomly placed, for instance, or they might be aligned with one another and centered along the centerline of the spray ring. Preferably, as will be discussed in greater detail below, the orifices are configured in such a manner as to optimize or at least substantially optimize the cooling of the stator.

More particularly, coolant preferably flows through the inlet 128 and around at least substantially half the circumference of the stator core 22 through one of the branches 130 or 132 of the stator-cooling passage 116 to reach the corresponding one of the collection areas 134 and 136. Then, aided by fluid pressure, coolant from the collection areas 134 and 136 flows generally upwardly along the flow path 118 through corresponding ones of the coolant-directing conduits 138 and 140. Concurrent with this upward flow, portions of the coolant are released through the orifices 166 and 168, respectively. Preferably, the orifices 166 and 168 are positioned and oriented such that coolant released therethrough is directed onto the stator 14. More particularly, the orifices 166 and 168 preferably spray coolant on the end turns 78 and 80 of the coils 24 of the stator 14. Still more particularly, the orifices 166 and 168 preferably spray coolant on the frontmost and rearmost regions 84a and 84b of the outermost side 84 of each coil 24.

Figure 19:
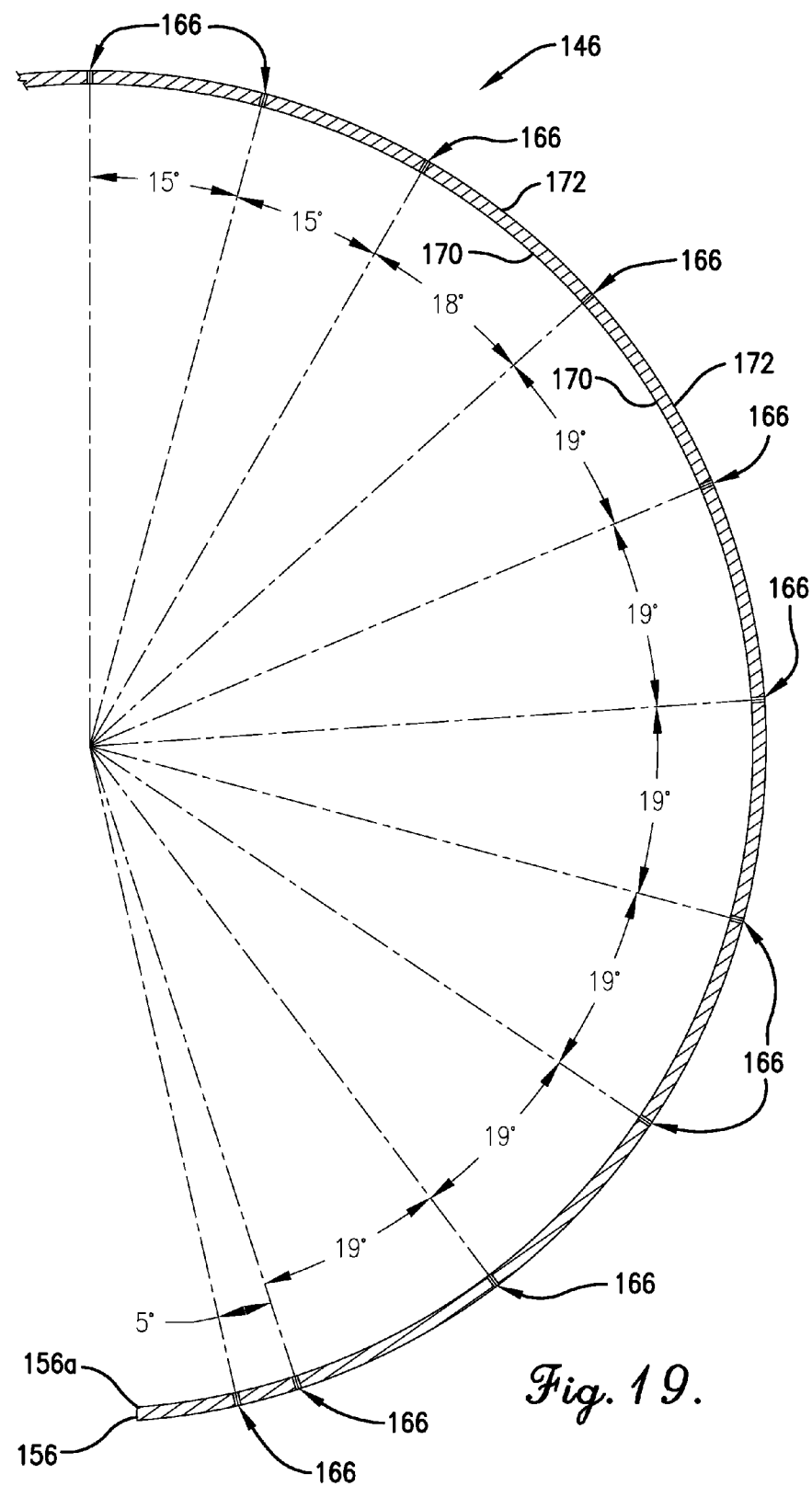
FIG. 19 is an enlarged, fragmentary cross-sectional front view of a spray ring as shown in FIGS. 1-5, 8-12, and 15-18, particularly illustrating the orifice spacing along the ring.

As best shown in FIG. 19 with regard to the spray ring 146 and as discussed in more detail below, the orifices 166 and 168 are preferably unevenly spaced apart in a circumferential direction. More particularly, an initial close spacing adjacent the ends 154,156 or 160,162, respectively, gives way to a larger spacing which then decreases toward the middle of the corresponding spray ring 146 or 148. For instance, as shown in FIG. 19, it is preferred that an initial close spacing of five degrees (5°) gives way to a larger spacing of nineteen degrees (19°), which then decreases to eighteen degrees (18°) and finally fifteen degrees (15°) at the midsection of the spray ring 146 or 148.

The aforementioned variable spacing of the orifices 166 and 168 is such that both the fluid pressure in the coolant-directing conduits 138 and 140 and fluid pressure through the orifices 166 and 168 is maintained to acceptable levels. That is, it is preferable for sufficient fluid pressure to be maintained in the coolant-directing conduits 138 and 140 to ensure coolant reaches around the entirety of the conduits 128 and 140, and sufficient pressure through the orifices is necessary to ensure coolant is directed with enough force to reach desired portions of the stator 14 when countered by forces such as gravity.

It is noted that the sizes and shapes of the orifices (though preferably circular and identical to one another, as illustrated) may additionally or alternatively be varied to influence the fluid pressure in the coolant-directing conduits and through the orifices.

Furthermore, the preferred variable spacing of the orifices 166 and 168 is such that the coolant is directed, flows, or falls onto appropriate portions for the stator 14 (e.g, the end turns 78 and 80, as discussed above). For instance, whereas coolant from upper ones of the orifices 166 and 168 might fall or flow from the uppermost ones of the end turns 78 and 80 onto intermediately positioned ones of the end turns 78 and 80, such coolant might be prevented from reaching the lowermost ones of the end turns 78 and 80 due to intervening structure (including other coils 24). However, the most closely spaced of the orifices 166 and 168 (located adjacent the ends 154,156 or 160,162, respectively) are positioned so as to aim coolant directly at the lowermost ones of the end turns 78 and 80 and with sufficient pressure to overcome or counterbalance any misdirection (i.e., drooping) associated with gravity. Positioning might also be guided at least in part by the presence of intervening structures or structure non in need of cooling, including by not limited to insulative structures associated with the coils 24.

Thus, in summary, the orifices 166 and 168 are preferably configured in terms of size, shape, spacing, general arrangement, etc. to in a broad sense optimize coolant flow onto the coils 24.

In a preferred embodiment, each spray ring 146,148 presents a constant, generally rectangular cross-section along its length, such that the spray ring 146 presents smooth, parallel inner and outer faces 170 and 172, and the spray ring 148 presents smooth, parallel inner and outer faces 174 and 176. Furthermore, each spray ring 146,148 preferably extends circumferentially in such a manner as to form an arc of a circle. The orifices 166 and 168 preferably extend at least substantially orthogonally relative to the immediately adjacent portions of the respective inner and outer faces 170,172 and 174,176 (i.e., at least substantially radially relative to the axis of rotation of the motor 10).

It is permissible according to some aspects of the present invention for coolant to be released onto additional and/or alternative portions of the coils as a results of alternative configurations of the spray rings, orifices, and/or other motor components in general.

Coolant sprayed onto the coils 24 thereafter deflects off of the coils 24. A portion of the deflected coolant preferably falls under the influence of gravity into a drainage collection area 178 defined by the shell 30 and is thereafter drained out of the motor chamber 36 in any suitable manner known in the art. Preferably, the drained coolant is directed to a recirculating system that cools and then pumps the coolant back to the motor. Some of the deflected coolant, however, falls into or is directed into the rear bearing assembly 42, where the coolant is the operable to lubricate and cool components of the rear bearing assembly 42, in a manner described in greater detail below.

Thus, in summary, a given supply of coolant first dissipates heat from the stator core 22 via travel through the stator-cooling passage 116, next dissipates heat from the end turns 122 of the coils 24 after being sprayed thereon through the respective orifices 166,168 of the spray rings 146,148, and finally cools and lubricates components of the rear bearing assembly 42.

Although circularly extending spray rings 146 and 148 positioned radially outside the stator 14 and the rotor 12 so as to circumscribe the stator 14 and the rotor 12 are preferred, it is also permissible according to some aspects of the present invention for the spray rings to extend circumferentially in a non-circular manner and/or for the spray rings to be positioned radially inside the stator and/or rotor (e.g., as would be the case for an outer rotor motor embodiment).

As noted previously, each spray ring 146 and 148 is expandable or contractible via modification of the size of the corresponding gap 158 or 164. As also noted previously, each spray ring assembly 142,144 comprises a spray ring 146 or 148, respectively, and a respective ring deflector 150 or 152. The ring deflectors 150 and 152 are operable to selectively deflect (i.e., expand or contract) the corresponding spray ring 146,148 to thereby expand or contract the corresponding gap 158,164. As will be apparent to one of ordinary skill in the art, expansion of the gap 158 or 164 and, in turn, the spray ring 146 or 148, is desirable to achieve a secure fit in the preferred embodiment, in which the spray rings 146 and 148 each circumscribe the rotor 12 and the stator 14. In contrast, contraction of the gap to contract the spray ring is desirable in certain alternative embodiments in which the spray rings are secured to a circumferentially smaller structure (e.g., in certain outer rotor motor embodiments).

Figure 18:
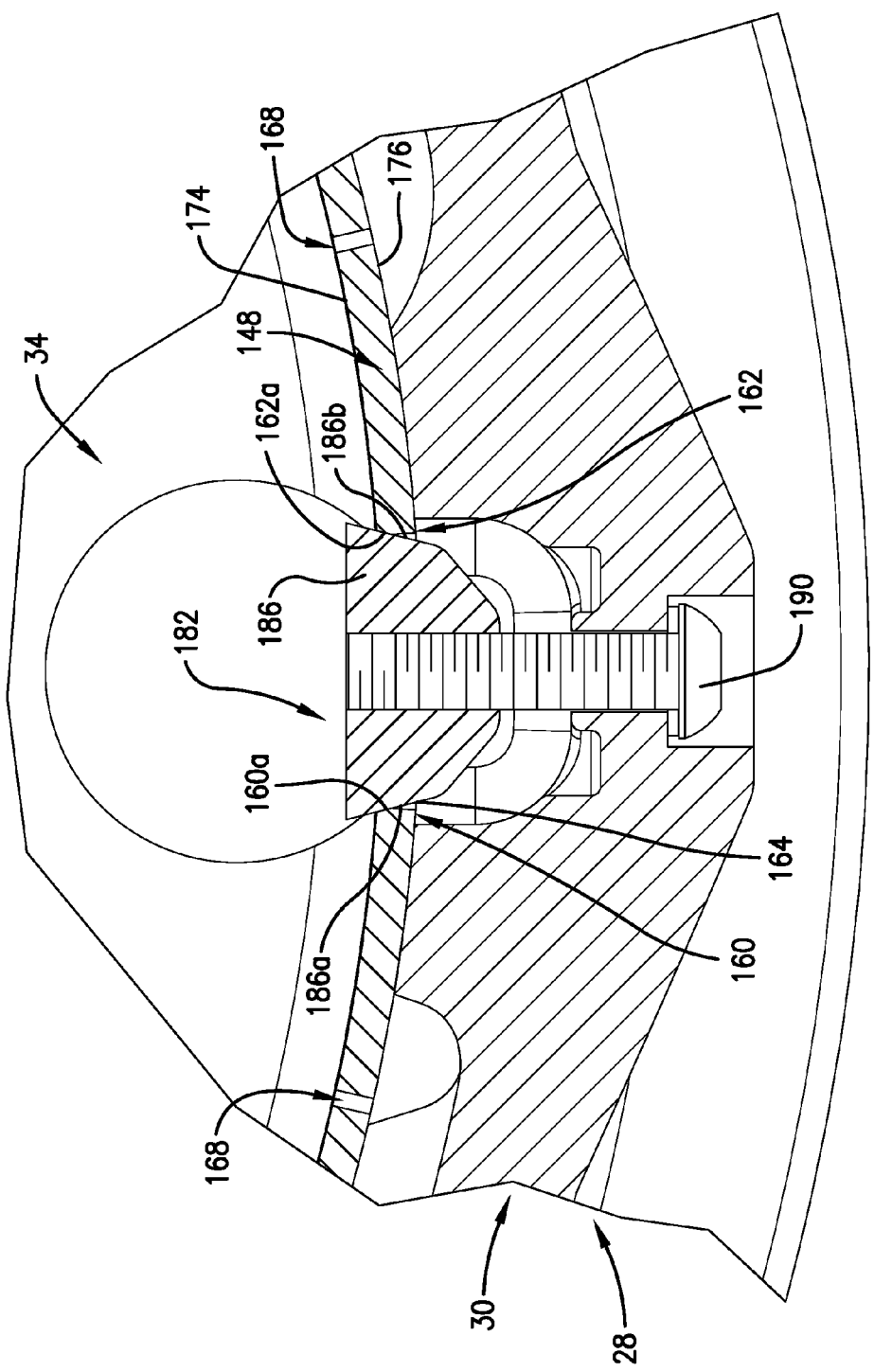
FIG. 18 is an enlarged, fragmentary view of a portion of the motor shell, rear end plate, and rear spray ring taken along line 18-18 of FIG. 16, particularly illustrating the use of a wedge for deflecting the spray ring and thereby at least in part securing the spray ring.

In a preferred embodiment and as shown in FIG. 18 and others, the ring deflectors 150,152, each preferably include a respective shiftable element 180 or 182. The shiftable elements 180 and 182 each comprise a respective wedge 184 or 186, in addition to an adjustable threaded fastener 188 or 190. Each wedge 184,186 is preferably adjustably positionable in a generally radial direction such that generally radial shifting of the wedge 184 or 186 deflects the corresponding one of the spray rings 146,148 and results in corresponding expansion or contraction of the gap 158 or 164.

More particularly, each wedge 184,186 preferably includes a pair of tapered faces 184a,184b and 186a,186b, respectively. The faces 184a,184b and 186a,186b preferably engage corresponding ones of the ends 154,156 and 160,162 of the spray rings 146 and 148, such that generally radial shifting of the each wedge 184,186 deflects the corresponding ends 154,156 and 160,162 and causes expansion or permits contraction of the gap 158 or 164 as described above. Such radial shifting is preferably driven by the corresponding fastener 188 or 190, which threadably engages the wedge 184 or 186 such that rotation of the fastener 188 or 190 results in the generally radial shifting of the wedge 184 or 186.

More particularly, rotation of the fastener 188 or 190 such that the wedge 184 or 186 shifts radially outwardly (i.e., threading of the fastener 188 or 190) results in expansion of the corresponding one of the rings 146 and 148. In contrast, rotation of the fastener 188 or 190 such that the wedge 184 or 186 shifts radially inwardly permits or enables the corresponding one of the rings 146 and 148 to contract (preferably as a result of its resilient nature and consequent return from the expanded state).

As best shown in FIG. 18, the ends 154,156 and 160,162 of the spray rings 146 and 148, respectively, preferably include respective chamfered corners 154a,156a and 160a,162a angularly corresponding to the tapered faces 184a, 184b and 186a,186b. Provision of the chamfered corners 154a,156a and 160a,162a enables a greater contact area to exist between each wedge 184 and 186 and the corresponding ends 154,156 and 160,162.

Although the above-described wedge-based deflector 150,152 is preferred, it is permissible according to some aspects of the present invention for alternative ring deflectors to be provided.

Figure 24:
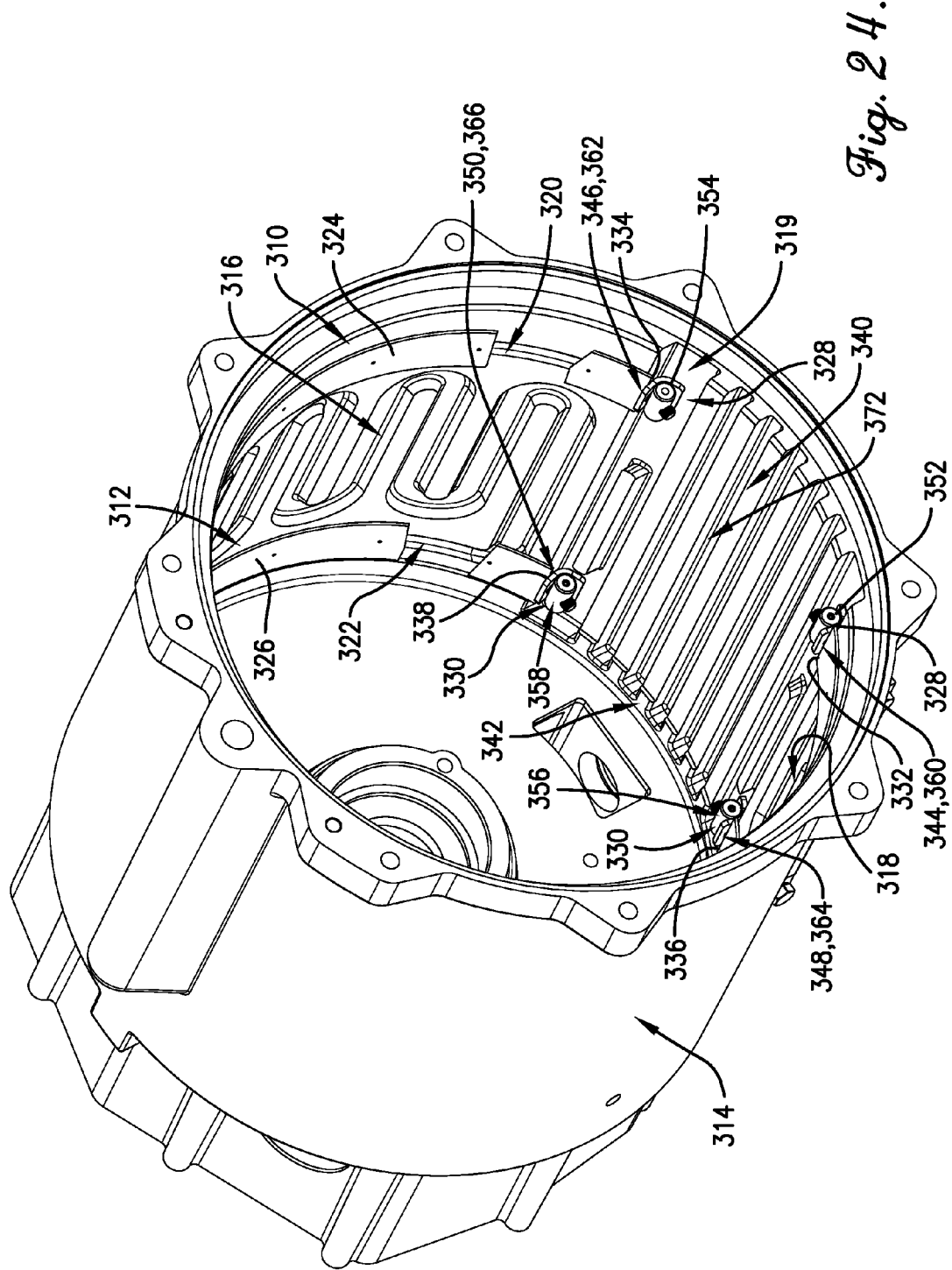
FIG. 24 is a front perspective view of a motor shell, a rear end plate, and a pair of spray rings in accordance with a second embodiment of the present invention.
Figure 25:
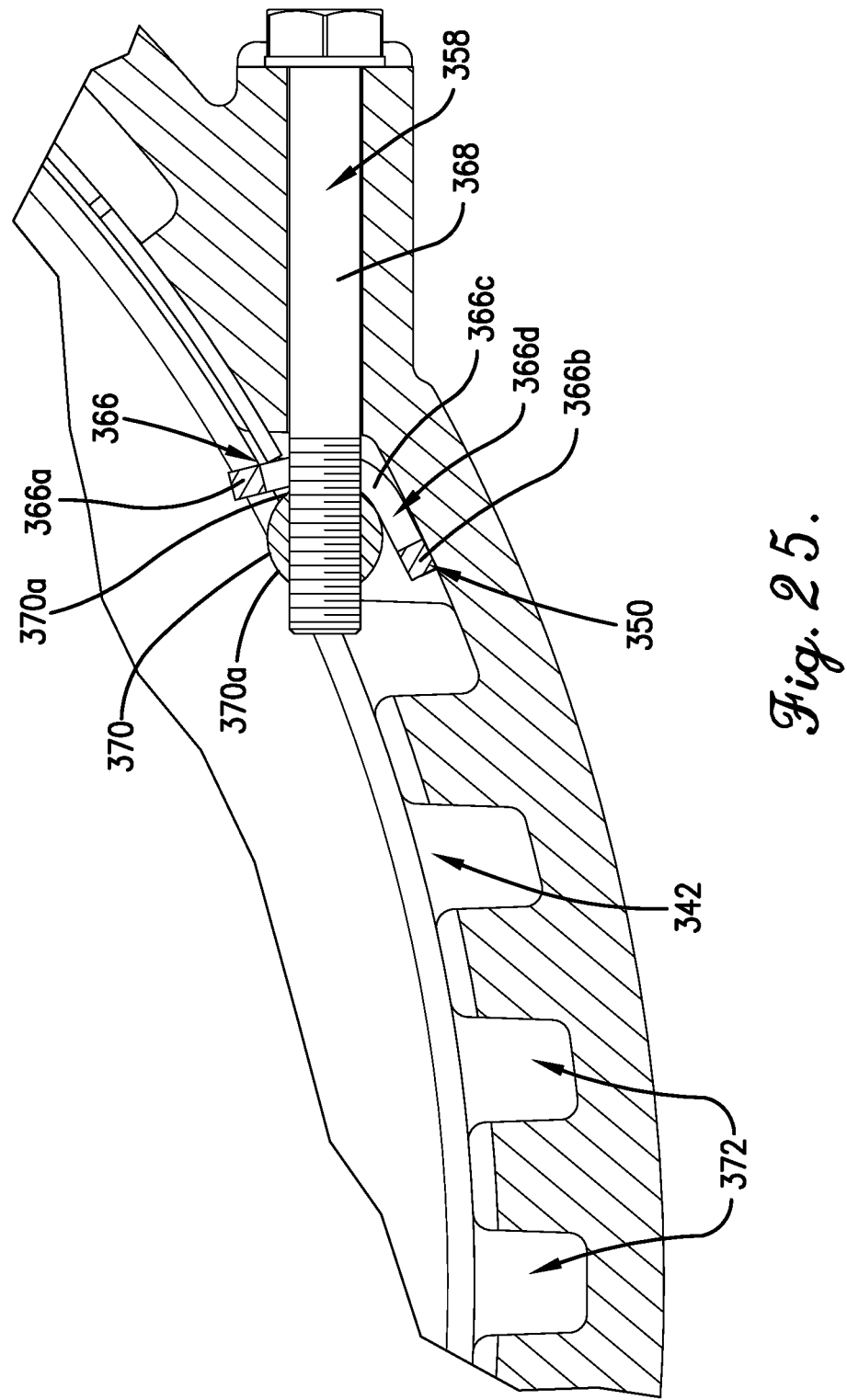
FIG. 25 is an enlarged, fragmentary, cross-sectional view of an adjustable fastener and a corresponding shiftable element for deflecting one of the spray rings of FIG. 24 and thereby at least in part securing the spray ring.

For instance, a second preferred pair of spray ring assemblies 310,312 and a second preferred motor shell 314 are shown in FIGS. 24 and 25. It is initially noted that, with certain exceptions to be discussed in detail below, many of the elements of the spray ring assemblies 310,312 and the motor shell 314 of the second embodiment are the same as or very similar to those described in detail above in relation the spray ring assemblies 142,144 and the motor shell 30 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well. It is particularly noted that the second embodiment may be provided with lubricant collection and distribution means that are similar to those associated with the rear bearing assembly 42 of the first preferred embodiment, despite an alternative configuration being illustrated in FIG. 24.

Similarly to the motor shell 30 of the first preferred embodiment, the motor shell 314 of the second preferred embodiment defines a stator-cooling passage 316 for directing coolant flow about a stator core (not shown). The motor shell 314 further preferably defines a pair of collection areas 318 and 319 downstream of and fluidly interconnected with the stator-cooling passage 316. Yet further, the motor shell 314 also similarly defines a pair of coolant-directing conduits 320,322.

Similarly to the spray ring assemblies 142,144 of the first preferred embodiment, the spray ring assemblies 310,312 of the second preferred embodiment preferably each include a respective spray ring 324,326 and a respective ring deflector 328,330. Each of the spray rings 324,326 includes a respective pair of ends 332,334 or 336,338. Furthermore, each of the spray rings 324,326 defines a respective gap 340 or 342 between the end pairs 332,334 and 336,338, respectively.

However, in contrast to the ring deflectors 150,152 of the first preferred embodiment, the ring deflectors 328,330 of the second preferred embodiment preferably each include a pair of shiftable elements 344,346 or 348,350 and a corresponding pair of adjustable fasteners 352,354 or 356,358. Each of the shiftable elements 344,346,348,350 preferably comprises a respective plate 360,362,364,366 received at least in part within the corresponding gap 340 or 342. Each fastener 352,354,356,358 preferably comprises a respective screw (e.g., screw 368 in FIG. 25) and a corresponding threadably interconnected nut (e.g., nut 370 in FIG. 25). The plates 360,362,364,366 preferably engage corresponding ones of the ends 332,334,336,338 of the corresponding spray rings 146,148, such that generally circumferential (i.e., generally lateral/tangential) shifting of the plates 360, 362,364,366 deflects the corresponding ends 332,334,336, 338 and causes expansion or permits contraction of the gaps 340,342.

More particularly, each plate 360,362,364,366 preferably includes a respective pair of generally orthogonally oriented sidewalls (e.g., sidewalls 366a,366b of FIG. 25), each of which is interconnected by a corresponding generally circularly extending rounded portion (e.g., rounded portion 366c of FIG. 25). The sidewalls are configured to engage respective ones of the ends 332,334,336,338. Furthermore, the sidewalls cooperate with the corresponding rounded portions to define respective elongated fastener-receiving slots (e.g., slot 366d of FIG. 25) therethrough.

Each nut is preferably generally cylindrical in form so as to present a circular cross-section. More particularly, each nut presents an outer rounded surface (e.g., surface 370a in FIG. 25) that engages the corresponding one of the plates 360,362,364,366 and, more particularly, engages primarily the rounded portion of the corresponding plate (e.g., rounded portion 366c of plate 366 in FIG. 25). Such shaping ensures a large contact area between each nut 376,378,380, 382 and the corresponding plate 360,362,364,366.

Rotation of each screw (e.g., screw 368 of FIG. 25) relative to the corresponding nut (e.g., nut 370 of FIG. 25) results in shifting of the corresponding plate 360,362,364, 366 along the corresponding fastener (e.g., plate 366 along fastener 358 of FIG. 25).

Provision of the elongated fastener-receiving slots (e.g., slot 366d of FIG. 25) facilitates rotation or sliding of each corresponding plate 360, 362, 364, and 366 about the corresponding nut (i.e., generally about the cylindrical axis thereof) such that the portion of each sidewall (e.g., sidewalls 366a,b of FIG. 25) that engages the corresponding end 332, 334, 336, or 338 of the spray ring 146 or 148 varies with the aforementioned generally transverse or circumferential shifting of the corresponding plate 360, 362, 364, and 366.

It is noted that, while features of the shiftable elements 344,346,348,350 are described above and illustrated in the figures, certain of these features are not directly identified in the figures. That is, some features are directly identified only in FIG. 25 and thus only with respect to the shiftable element 350. However, the other shiftable elements (i.e., the shiftable elements 344,346,348) are preferably similarly configured.

Also, similarly to the shell 30 of the first preferred embodiment, the shell 314 of the second preferred embodiment defines a drainage collection area 372 from which lubricant is drained out of the motor chamber in any suitable manner known in the art.

A third preferred motor shell 410 is shown in FIGS. 26-29. It is initially noted that, with certain exceptions to be discussed in detail below, many of the elements of the motor shell 410 of the third embodiment are the same as or very similar to those described in detail above in relation to the motor shell 30 of the first embodiment and/or the motor shell 314 of the second embodiment. Therefore, for the sake of brevity and clarity, redundant descriptions and numbering will be generally avoided here. Unless otherwise specified, the detailed descriptions of the elements presented above with respect to the first and/or second embodiment should therefore be understood to apply at least generally to the third embodiment, as well. It is particularly noted that the third embodiment may be provided with lubricant collection and distribution means that are similar to those associated with the rear bearing assembly 42 of the first preferred embodiment, despite an alternative configuration being illustrated in FIGS. 26-29.

Similarly to the motor shell 30 of the first preferred embodiment and the motor shell 314 of the second preferred embodiment, the motor shell 410 of the third preferred embodiment defines a stator-cooling passage 412 for directing coolant flow about a stator core (not shown). The motor shell 410 further preferably defines a pair of collection areas 414,416 downstream of and fluidly interconnected with the stator-cooling passage 412. Yet further, the motor shell 410 also similarly defines a pair of coolant-directing conduits 418,420.

Coolant preferably enters the stator-cooling passage 412 via a coolant inlet 422 defined by the shell 410. The inlet 422 preferably comprises an axially extending conduit defined through a reinforced portion or rib 424 of the shell 410.

Preferably, the inlet 422 adjoins the stator-cooling passage 412 at a generally centered location between front and rear margins 426 and 428, respectively, of the stator-cooling passage 412. Offset configurations are permissible according to some aspects of the present invention, however.

As described above with respect to the first and second preferred embodiments, the stator-cooling passage 412 of the third preferred embodiment is preferably generally tortuous in form. In a preferred embodiment, for instance, the stator-cooling passage 412 includes a plurality of fluidly interconnected, generally S-shaped portions that direct coolant in part in a first generally circumferential direction through a first branch 430 of the stator-cooling passage 412 and in part in a second generally circumferential direction through a second branch 432 of the stator-cooling passage 412. That is, the flow path of the coolant is unitary at the inlet 422 but thereafter diverges in circumferentially opposite directions such that the coolant flows about opposite sides of the stator core (not shown).

The collection areas 134 and 136 of the first preferred embodiment directly connect with the corresponding ones of the coolant-directing conduits 138 and 140. Similarly, the collection areas 318 and 319 of the second preferred embodiment directly connect with the corresponding ones of the coolant-directing conduits 320 and 322. In contrast, the collection areas 414 and 416 of the third preferred embodiment connect with the corresponding ones of the coolant-directing conduits 418 and 420 by means of corresponding transfer channels 434 and 436.

More particularly, enclosed, generally axially extending transfer channels 434 and 436 are defined exclusively by the shell 410 to respectively interconnect collection area 414 with conduit 420 and collection area 416 with conduit 418. Such a configuration reduces and, most preferably, eliminates the occurrence of leakage during transfer of coolant between the collection areas 414,416 and the coolant-directing conduits 418,420. Such a configuration is particularly useful in maintaining the coolant at a high enough pressure to assuredly propel the coolant through the coolant-directing conduits 418,420.

Although fully enclosed transfer channels 434 and 436 are preferred, as illustrated, it is permissible for channels fluidly interconnected to one or more peripheral openings (e.g. a slit or a pair of bleed holes for pressure release as needed) to alternatively be provided.

Similarly to the shell 30 of the first preferred embodiment and the shell 314 of the second preferred embodiment, the shell 410 of the third preferred embodiment further defines a drainage collection area 438 from which coolant or lubricant is drained out of the motor chamber in any suitable manner known in the art.

Furthermore, excess coolant or lubricant from the transfer channels 434 and 436 that does not enter one of the coolant-directing conduits 418,420 is drained out of the motor chamber via drainage channels 440,442 in fluid communication with corresponding ones of the transfer channels 434 and 436.

Bearing Assemblies

Turning again to the first preferred embodiment and as noted previously, the motor 10 includes front and rear bearing assemblies 40 and 42 that rotatably support the shaft assembly 20. More particularly, the front bearing assembly 40 supports the front end 104 of the hub 90, as well as the shaft 96. The rear bearing assembly 42 supports the rear end 106 of the hub 90.

The front bearing assembly 40 preferably comprises a ball bearing 92, although other types of bearing (e.g., roller bearings, sleeve bearings, etc.) may be used as appropriate.

The rear bearing assembly 42 preferably comprises a ball bearing 92 and a lubricant collection structure 192. However, although a ball bearing 92 is preferred, it is permissible for other types of bearings (e.g., roller bearings, sleeve bearings, etc.) to be used as appropriate.

The lubricant collection structure 192 preferably includes a bearing cap 194 that secures the bearing 92 relative to the housing 28. More particularly, the housing 28 defines a bearing pocket 196 that at least substantially receives the bearing 92, with the bearing cap 194 at least in part spanning the bearing pocket 196 and securing the bearing 92 therein.

In a preferred embodiment, the bearing cap 194 secures the bearing 92 to the rear end plate 34 (and within the bearing pocket 196) by means of a plurality of fasteners 198 extending through a corresponding plurality of fastener-receiving holes 200. Preferably, the fastener-receiving holes 200 extend through corresponding arcuately spaced apart bosses 202 forming part of the bearing cap 194 (see, for instance, FIGS. 13 and 14). However, alternative or additional securement means (e.g., latches or adhesives) and arrangements are permissible according to some aspects of the present invention.

The lubricant collection structure 192 is configured to direct lubricant to the ball bearing 92. More particularly, the lubricant collection structure 192 preferably defines a collection chamber 204 configured to collect lubricant from the motor chamber 36 and direct the lubricant to the bearing 92. Preferably, the lubricant collection structure 192 defines an open top 206 to the collection chamber 204. The open top 206 is preferably positioned below some of the windings or coils 24, such that lubricant deflected, dripping, etc. from the coils 24 falls downwardly from the coils 24 into the collection chamber 204 (i.e., by means of gravity). As noted previously, the remaining lubricant falls to the drainage collection area 178.

In a preferred embodiment, the rear end plate 34 includes a pair of generally radially extending, generally arcuately spaced apart ribs 208 and 210 defining a connecting surface 212 therebetween. The bearing cap 194 includes a generally radially and arcuately extending flange 214. The flange 214 preferably contacts and extends generally arcuately between the ribs 208 and 210 and is axially spaced from the connecting surface 212, such that the ribs 208 and 210, the connecting surface 212, and the flange 214 cooperatively at least substantially define the collection chamber 204. Thus, in the preferred embodiment, the lubricant collection structure 192 and, more particularly, the collection chamber 204, is cooperatively defined by both the bearing cap 194 and a portion of the rear end plate 34 of the housing 28.

In a preferred embodiment, two (2) of the bosses 202 are coextensive with the flange 214. Distinct bosses are permissible, however.

Figure 20:
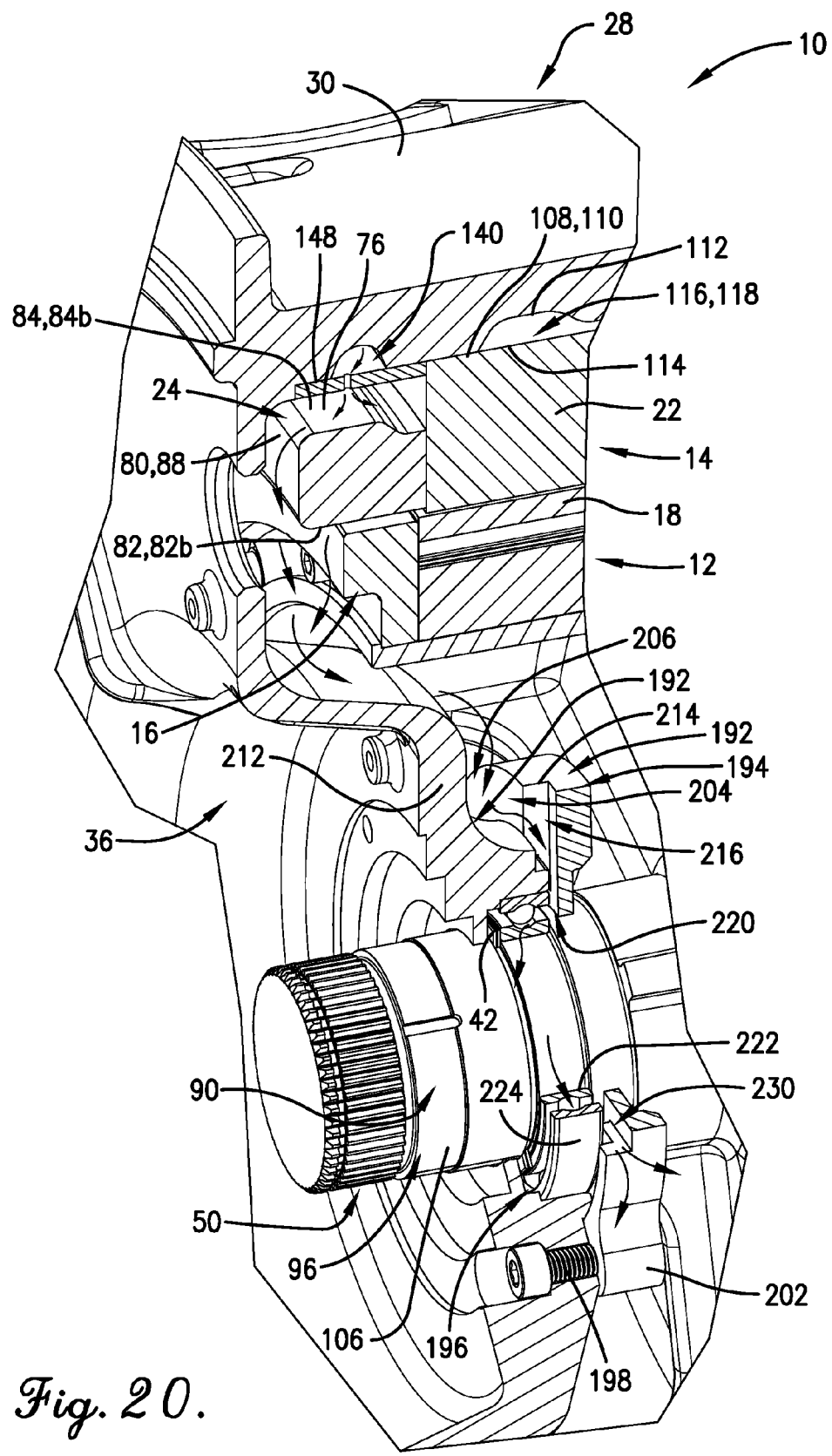
FIG. 20 is an enlarged, fragmentary, cross-sectional rear perspective view of motor, particularly illustrating end turn cooling and bearing lubrication.
Figure 21:
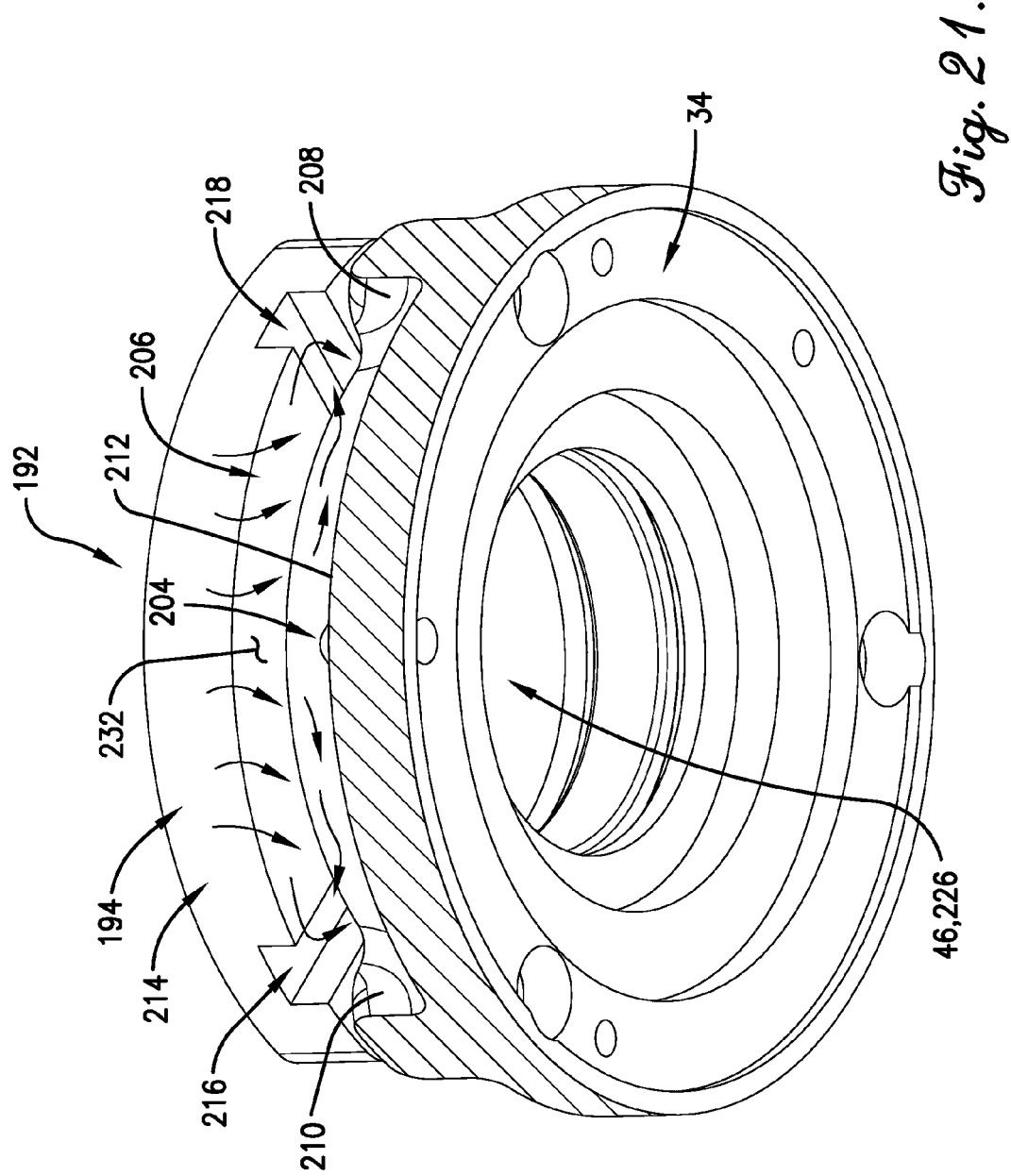
FIG. 21 is an enlarged, fragmentary, top perspective view of the backs of the rear end plate, bearing, and bearing cap, particularly illustrating the fluid collection chamber.
Figure 22:
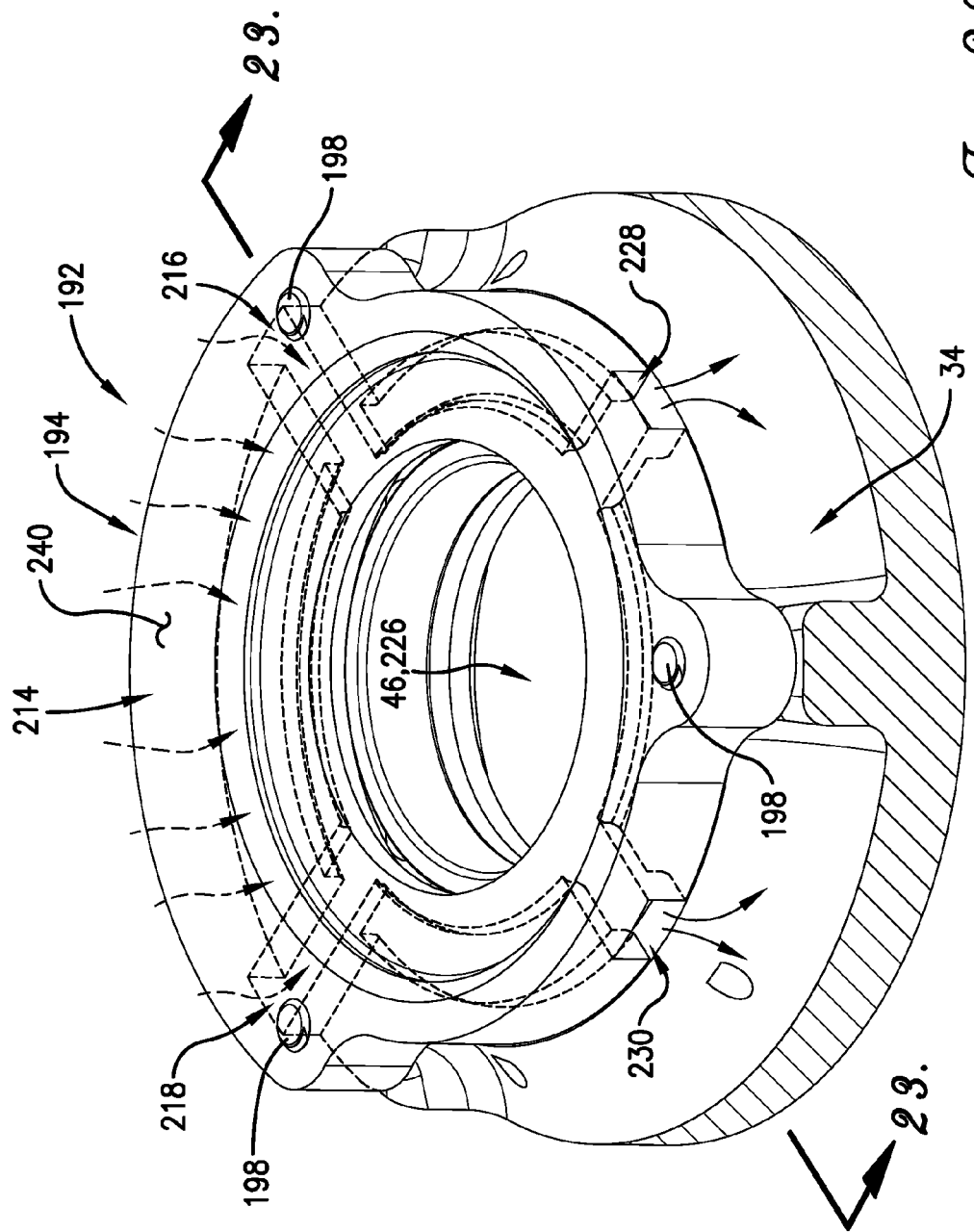
FIG. 22 is a bottom perspective view of the fronts of the rear end plate, bearing, and bearing cap of FIG. 21.
Figure 23:
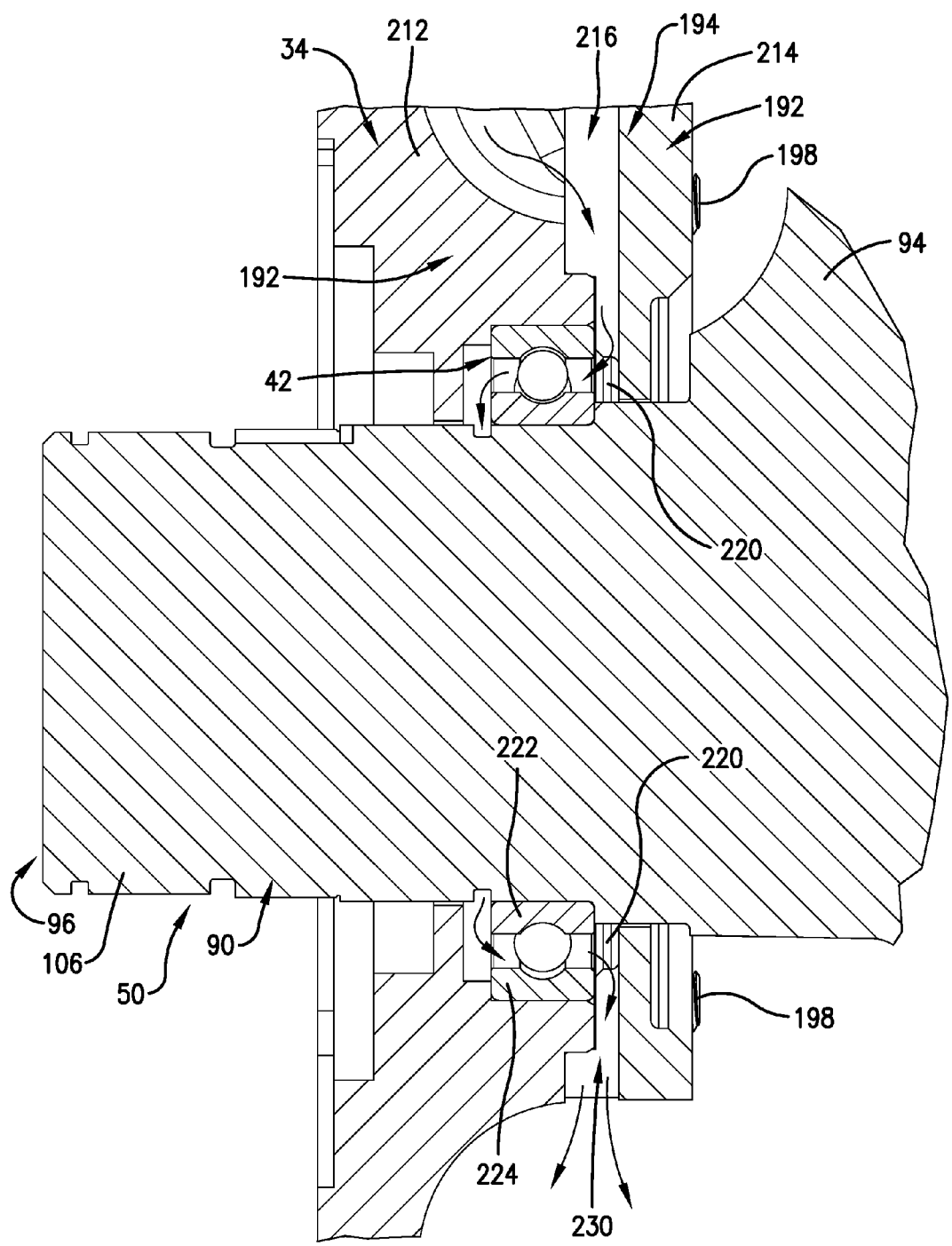
FIG. 23 is an enlarged, fragmentary, cross-sectional side view of the rear end plate, bearing, and bearing cap taken along line 23-23 of FIG. 22, in addition to the shaft, and particularly illustrating the flow path of coolant through the collection chamber, bearing cap, and bearing.

As best shown in FIG. 20, in which arrows schematically represent coolant flow, the collection chamber 204 preferably receives coolant deflected off of the end turns 122. The coolant thus is preferably additionally functional as a lubricant. The terms "coolant" and "lubricant" as used herein should therefore be understood to be in reference to the same substance. Additional fluid contained in the motor chamber 36 may also be received.

As best shown in FIGS. 15 and 20-23, the lubricant collection structure 192 further preferably defines a pair of generally radially extending, arcuately spaced apart lubricant supply passages 216 and 218 in fluid communication with the collection chamber 204. As shown schematically by means of arrows, lubricant from the collection chamber 204 flows into the supply passages 216 and 218.

The rear end plate 34 and the bearing cap 194 preferably cooperatively at least in part define the supply passages 216 and 218. More particularly, the supply passages 216 and 218 are at least in part defined by the flange 214.

The supply passages 216 and 218 are preferably at least substantially straight. It is permissible, however, for curved or meandering supply passages to be provided.

The lubricant collection structure 192 additionally defines a lubricant interface area 220 in fluid communication with the supply passages 216 and 218 and configured to receive lubricant from the supply passages 216 and 218. The interface area 220 preferably abuts the bearing 92 and abuts or nearly abuts the rotor end 98 of the hub 90. The interface area 220 is thus configured such that lubricant therein lubricates the bearing 92.

Figure 16:
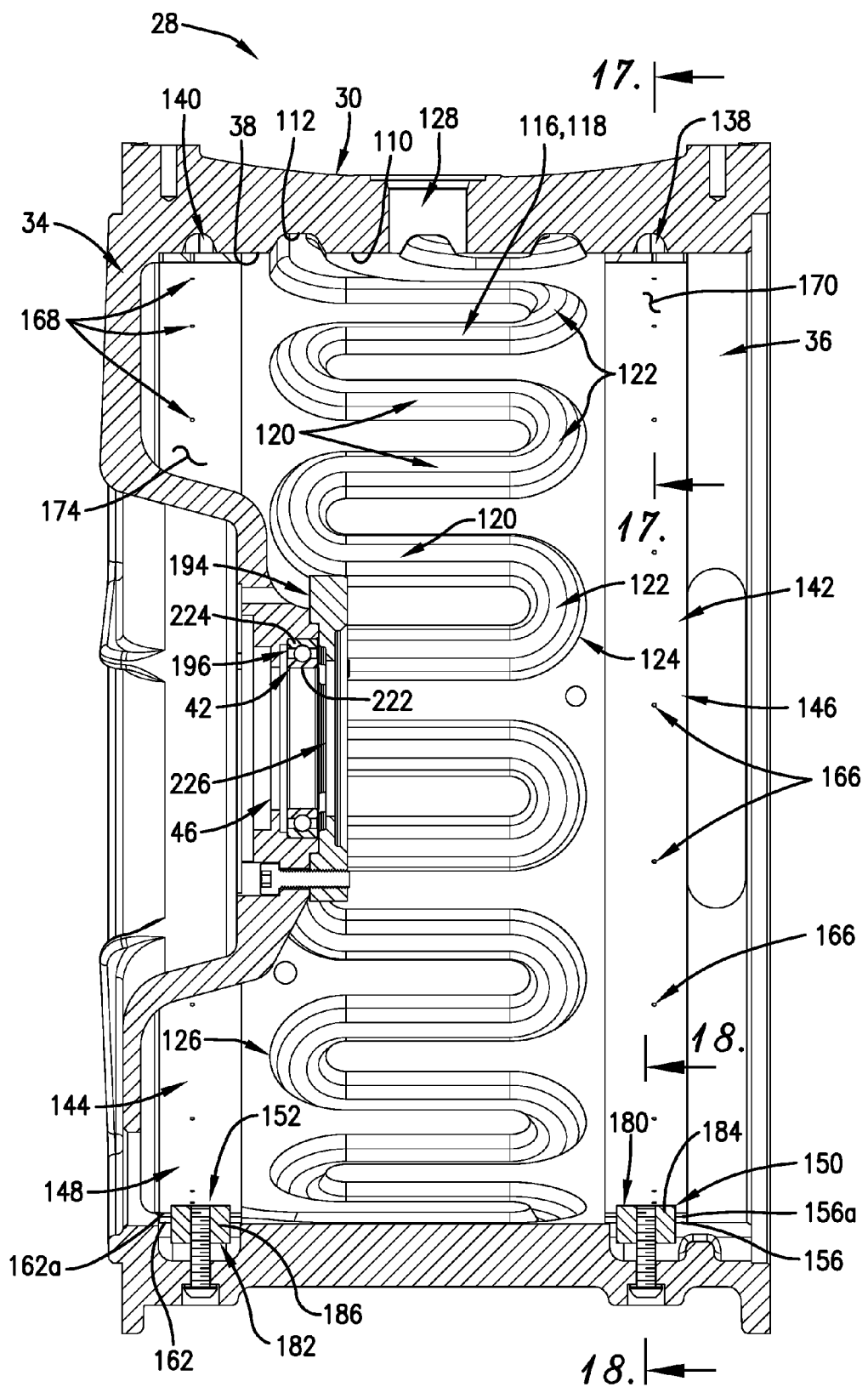
FIG. 16 is a cross-sectional side view of the motor shell, rear end plate, spray rings, and bearing cap taken along line 16-16 of FIG. 15.
Figure 17:
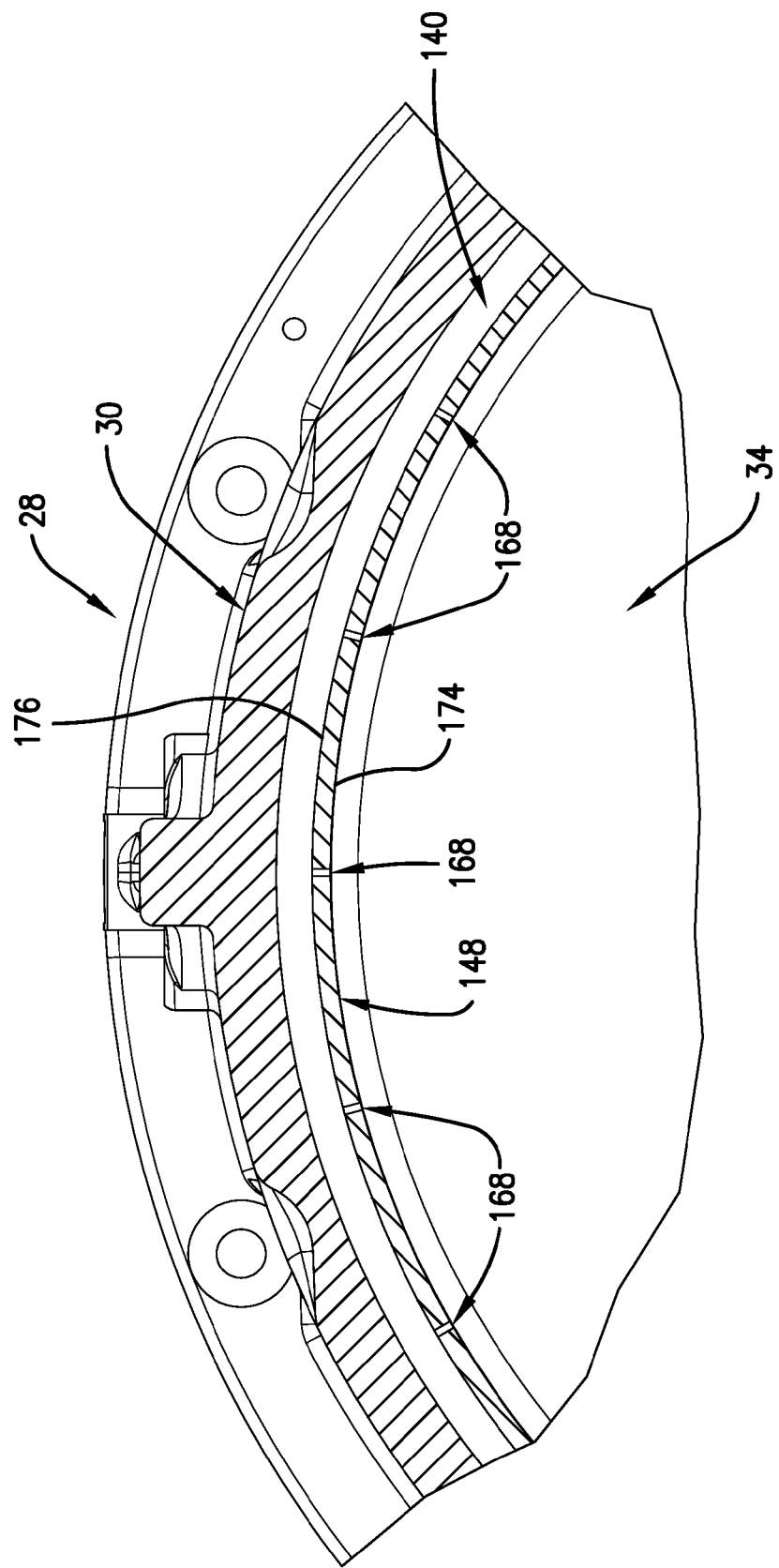
FIG. 17 is an enlarged, fragmentary view of a portion of the motor shell, rear end plate, and rear spray ring taken along line 17-17 of FIG. 16.

More particularly, the bearing 92 preferably includes an inner race 222 and an outer race 224. As shown in FIGS. 10, 16, and others, the lubricant collection structure 192 preferably abuts the outer race 224 except at the supply passages 216 and 218 and at exit locations to be discussed in greater detail below. In contrast, the lubricant collection structure 192 is preferably axially spaced from the inner race 222. Thus, coolant may pass through the supply passages 216 and 218 into the lubricant interface area 220 defined between the bearing 92, the lubricant collection structure 192, and the rotor end 98 of the hub 90.

Preferably, the lubricant collection structure 192 defines a hub-receiving opening 226 therethrough. The rotor end 98 of the hub 90 preferably extends through the hub-receiving opening 226 and further defines the lubricant interface area 220. Thus, the lubricant interface area 220 preferably extends generally circumferentially about the hub 90.

In addition, the lubricant collection structure 192 preferably includes a pair of generally radially extending, arcuately spaced apart lubricant drainage channels 228 and 230 in fluid communication with the interface area 220. The drainage channels 228 and 230 are preferably configured to drain lubricant from the interface area 220.

Although a pair of radially extending, arcuately spaced apart drainage channels 228 and 230 are preferred, it is permissible for an alternatively configured drainage channel(s) to be provided. For instance, a single channel could be provided for drainage, or a plurality of parallel channels could be provided. Furthermore, although the drainage channels 228 and 230 are preferably at least substantially straight, it is permissible according to some aspects of the present invention for curved or meandering drainage passages to be provided.

As at least in part indicated by the above structural and functional descriptions of the bearing cap 194, the bearing cap 194 is preferably tiered in form. As best shown in FIG. 13, for instance, the bearing cap 194 presents a rear face 232 defined by axially spaced outer, intermediate, and inner tiers 234, 236, and 238, respectively. As best shown in FIG. 14, the bearing cap 194 presents a front face 240 defined by axially spaced apart outside and inside tiers 242 and 244, respectively. Provision of the tiers 242 and 244 and, more particularly, the recessed nature of the inside tier 244 relative to the outside tier 242 enables contact to be avoided between the bearing cap 194 and the hub 90. Provision of the outer tier 234 enables a secure fit against the portion of the rear end plate 34 that defines the bearing pocket 196. Provision of the intermediate tier 236 enables a secure fit against both the aforementioned portion of the rear end plate 34 and the outer race 224 of the bearing assembly 42. Provision of the recessed inner tier 238 enables formation of the interface area 220.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A motor configured to be cooled with a coolant, said motor comprising:
    a rotor rotatable about an axis;
    a stator including a stator core and windings wound about the stator core;
    a housing enclosing at least a portion of the stator;
    a resiliently deflectable spray ring extending circumferentially relative to the axis,
    said spray ring defining at least one orifice configured to direct coolant on the stator,
    said spray ring presenting first and second arcuately spaced apart ends defining a gap therebetween,
    said housing including an inner surface defining a recessed channel,
    said spray ring overlying and enclosing said channel such that the inner surface and the spray ring cooperatively define a coolant-directing conduit that extends circumferentially around at least substantially half of the circumference of the stator core,
    said coolant-directing conduit configured to direct coolant to the at least one orifice; and
    a ring deflector operable to selectively deflect the spray ring and thereby expand or contract the gap,
    said ring deflector comprising a wedge fitted in the gap,
    said wedge being adjustably positionable in a generally radial direction,
    said wedge including a pair of tapered faces engaging corresponding ones of the ends of the spray ring, such that generally radial shifting of the wedge deflects the spray ring and results in corresponding expansion or contraction of the gap.

2. The motor as claimed in claim 1,
    said ring deflector further comprising a threaded fastener that extends generally radially,
    said fastener threadably engaging the wedge, with rotation of the fastener resulting in the generally radial shifting of the wedge.

3. The motor as claimed in claim 1,
    said ring deflector further comprising an adjustable fastener coupled to the wedge, with adjustment of the fastener resulting in shifting of the wedge and thereby deflection of the spray ring.

4. The motor as claimed in claim 1,
    said stator core presenting an outer circumferential surface; and a stator-cooling passage extending along the outer surface of the core, with the passage being configured to receive coolant flow so as to remove heat from the stator core during operation of the motor, said conduit extending between and fluidly interconnecting the stator-cooling passage and the at least one orifice.

5. The motor as claimed in claim 4, said inner surface of the housing cooperating with the outer surface of the stator core to define the stator-cooling passage.

6. The motor as claimed in claim 5, said housing defining an inlet fluidly interconnected with the stator-cooling passage, said stator-cooling passage extending in opposite circumferential directions from the inlet.

7. The motor as claimed in claim 1, said stator core including opposite first and second ends spaced along the axis, said windings including end turns positioned adjacent the first end of the stator core, said spray ring configured to direct coolant onto the end turns.

8. The motor as claimed in claim 7, said at least one orifice configured to direct coolant generally radially onto the end turns.

9. The motor as claimed in claim 8, said spray ring at least substantially circumscribing the end turns, said at least one orifice configured to direct coolant generally radially inwardly onto the end turns.

10. The motor as claimed in claim 7, said windings including additional end turns positioned at the second end of the stator core; and a second resiliently deflectable spray ring extending circumferentially relative to the axis and defining at least one second orifice configured to direct coolant on the additional end turns, said second spray ring presenting first and second arcuately spaced apart second ends defining a second gap therebetween.

11. The motor as claimed in claim 1, said spray ring defining a plurality of said orifices, said orifices being arcuately spaced apart.

12. The motor as claimed in claim 11, adjacent ones of said orifices defining an orifice spacing therebetween, said orifice spacing progressively decreasing for at least some of said adjacent ones of the orifices in a direction moving away from the ends.

13. The motor as claimed in claim 11, at least some of said orifices being variably configured so as to optimize direction of coolant on the stator.

14. The motor as claimed in claim 1, said motor further including a bearing assembly configured to be lubricated by coolant deflected from the stator.

15. A motor configured to be cooled with a coolant, said motor comprising:

a rotor rotatable about an axis;

a stator including a stator core and windings wound about the stator core;

a housing enclosing at least a portion of the stator;

a resiliently deflectable spray ring extending circumferentially relative to the axis, said spray ring defining at least one orifice configured to direct coolant on the stator, said spray ring presenting first and second arcuately spaced apart ends defining a gap therebetween; and a ring deflector operable to selectively deflect the spray ring and thereby expand or contract the gap, said ring deflector comprising a wedge fitted in the gap, said ring deflector further comprising a threaded fastener that extends generally radially, said wedge including a pair of tapered faces engaging corresponding ones of the ends of the spray ring, such that generally radial shifting of the wedge deflects the spray ring and results in corresponding expansion or contraction of the gap, said fastener threadably engaging the wedge, with rotation of the fastener resulting in the generally radial shifting of the wedge.

16. The motor as claimed in claim 15, further comprising:

a coolant-directing conduit configured to direct coolant to the at least one orifice, said spray ring at least in part defining the conduit.

17. The motor as claimed in claim 16, said housing including an inner surface defining a recessed channel, said spray ring overlying said channel such that the inner surface and the spray ring cooperatively define the conduit.

* * * * *